US012750607B2

(12) United States Patent
Machida

(10) Patent No.: US 12,750,607 B2
(45) Date of Patent: Sep. 29, 2026

(54) IMAGING DEVICE AND ELECTRONIC APPARATUS

(71) Applicant: Sony Semiconductor Solutions Corporation, Kanagawa (JP)

(72) Inventor: Takashi Machida, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 330 days.

(21) Appl. No.: 18/692,136

(22) PCT Filed: Sep. 14, 2022

(86) PCT No.: PCT/JP2022/034421
§ 371 (c)(1),
(2) Date: Mar. 14, 2024

(87) PCT Pub. No.: WO2023/074168
PCT Pub. Date: May 4, 2023

(65) Prior Publication Data

US 2024/0430591 A1 Dec. 26, 2024

(30) Foreign Application Priority Data

Nov. 1, 2021 (JP) ................................ 2021-178914

(51) Int. Cl.
*H04N 25/77* (2023.01)
*H04N 25/768* (2023.01)
(Continued)

(52) U.S. Cl.
CPC ......... *H04N 25/772* (2023.01); *H04N 25/768* (2023.01); *H04N 25/78* (2023.01)

(58) Field of Classification Search
CPC ..... H04N 25/772; H04N 25/78; H04N 25/768
See application file for complete search history.

(56) References Cited

U.S. PATENT DOCUMENTS 10,547,802 B2 * 1/2020 Sakakibara ............ H04N 25/79

FOREIGN PATENT DOCUMENTS

| | | | |
|---|---|---|---|
| JP | 2021034862 | A | 3/2021 |
| WO | 2006129762 | A1 | 12/2006 |
| WO | 2016136486 | A1 | 9/2016 |

OTHER PUBLICATIONS

International Search Report (PCT/ISA/210), International Application No. PCT/JP2022/034421, dated Dec. 6, 2022.

* cited by examiner

*Primary Examiner* — Lin Ye
*Assistant Examiner* — Fayez A Bhuiyan
(74) *Attorney, Agent, or Firm* — Michael Best & Friedrich LLP

(57) ABSTRACT

An imaging device according to one embodiment of the present disclosure includes one or more light receiving pixels that generate electric charges according to an amount of received light through photoelectric conversion; one or more analog-to-digital conversion circuits that are provided for each of the light receiving pixels and that convert an analog signal read from each of the one or more light receiving pixels into a digital signal; and a plurality of pixel units each including the one or more light receiving pixels and the one or more analog-to-digital conversion circuits. The plurality of pixel units is disposed to allow the one or more light receiving pixels to be adjacent to each other in two pixel units that are adjacent to each other in a first direction.

16 Claims, 25 Drawing Sheets

(51) Int. Cl.

| | |
|---|---|
| ***H04N 25/772*** | (2023.01) |
| ***H04N 25/78*** | (2023.01) |

[ FIG. 1 ]
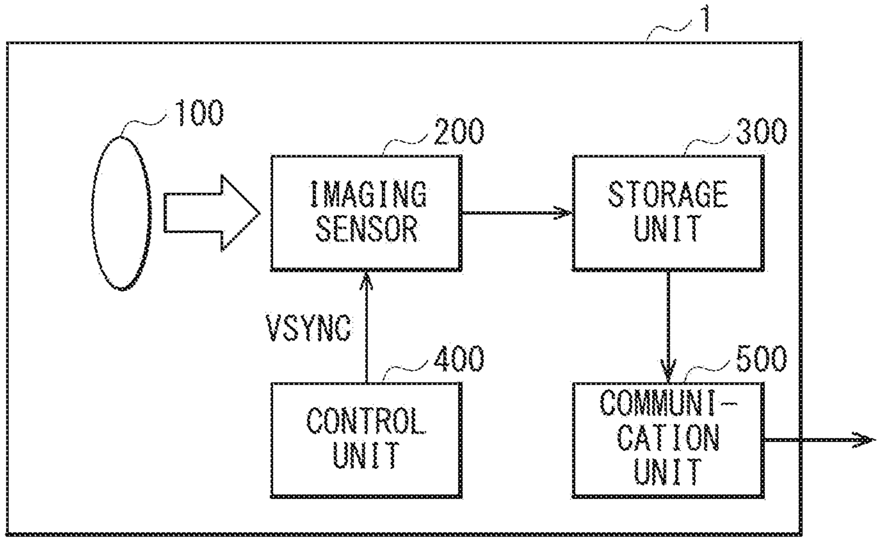
[ FIG. 2 ]
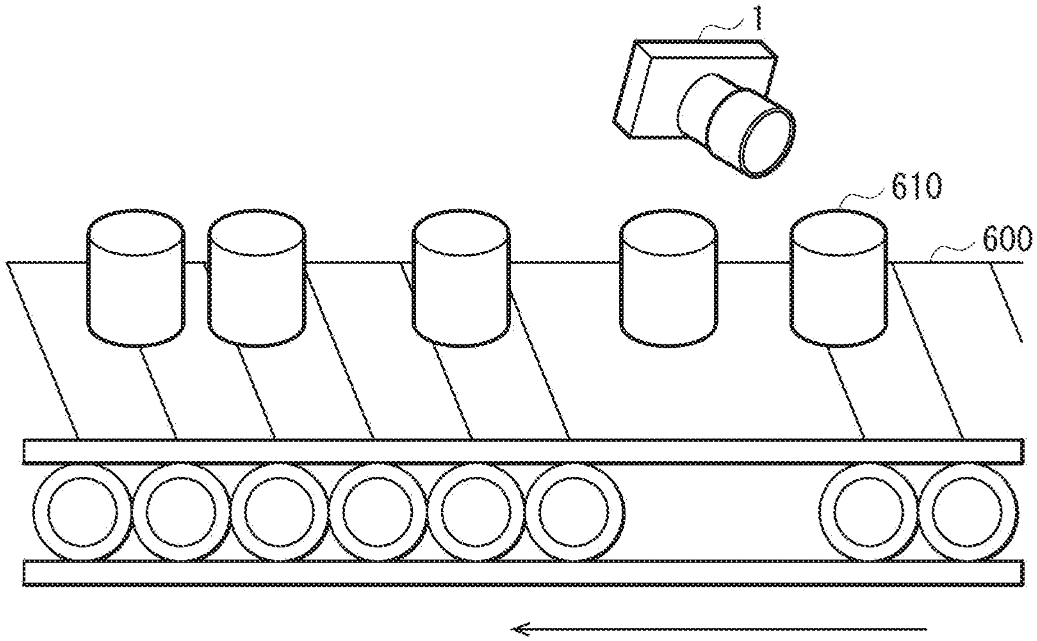

[ FIG. 3 ]
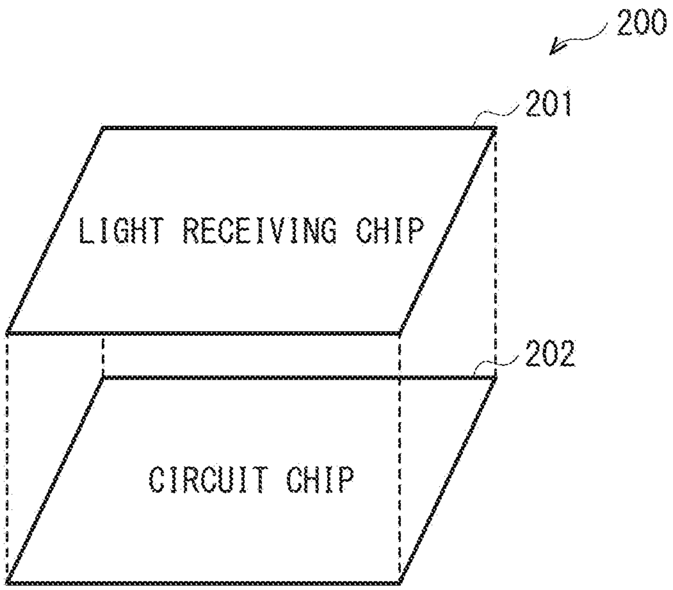
[ FIG. 4 ]
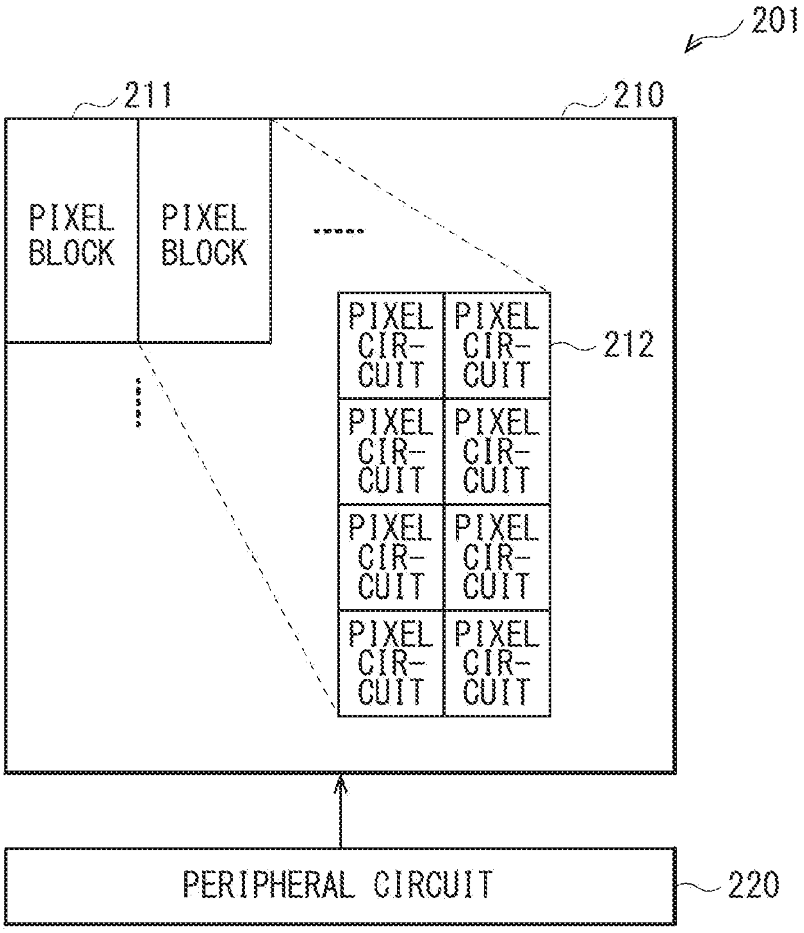

[ FIG. 5 ]
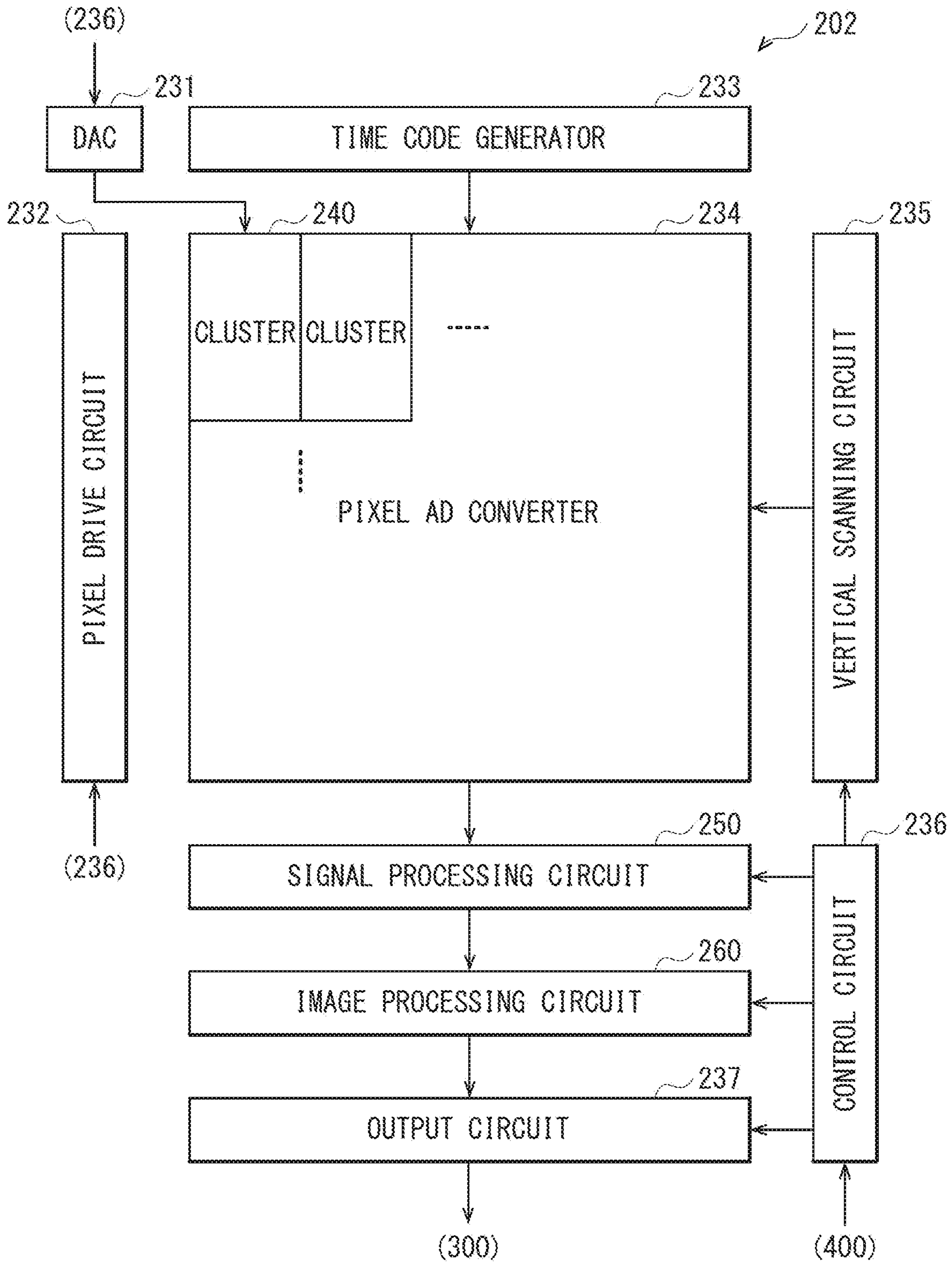

[ FIG. 6 ]
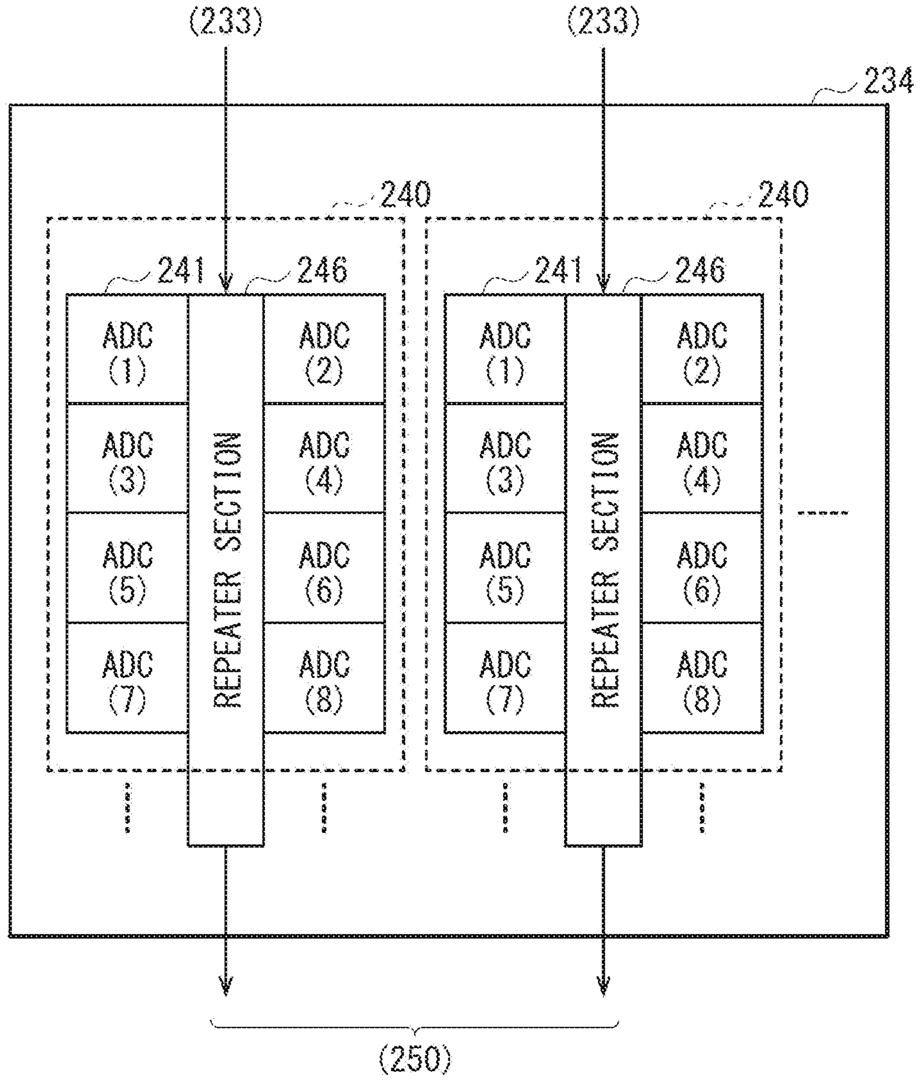

[ FIG. 8 ]
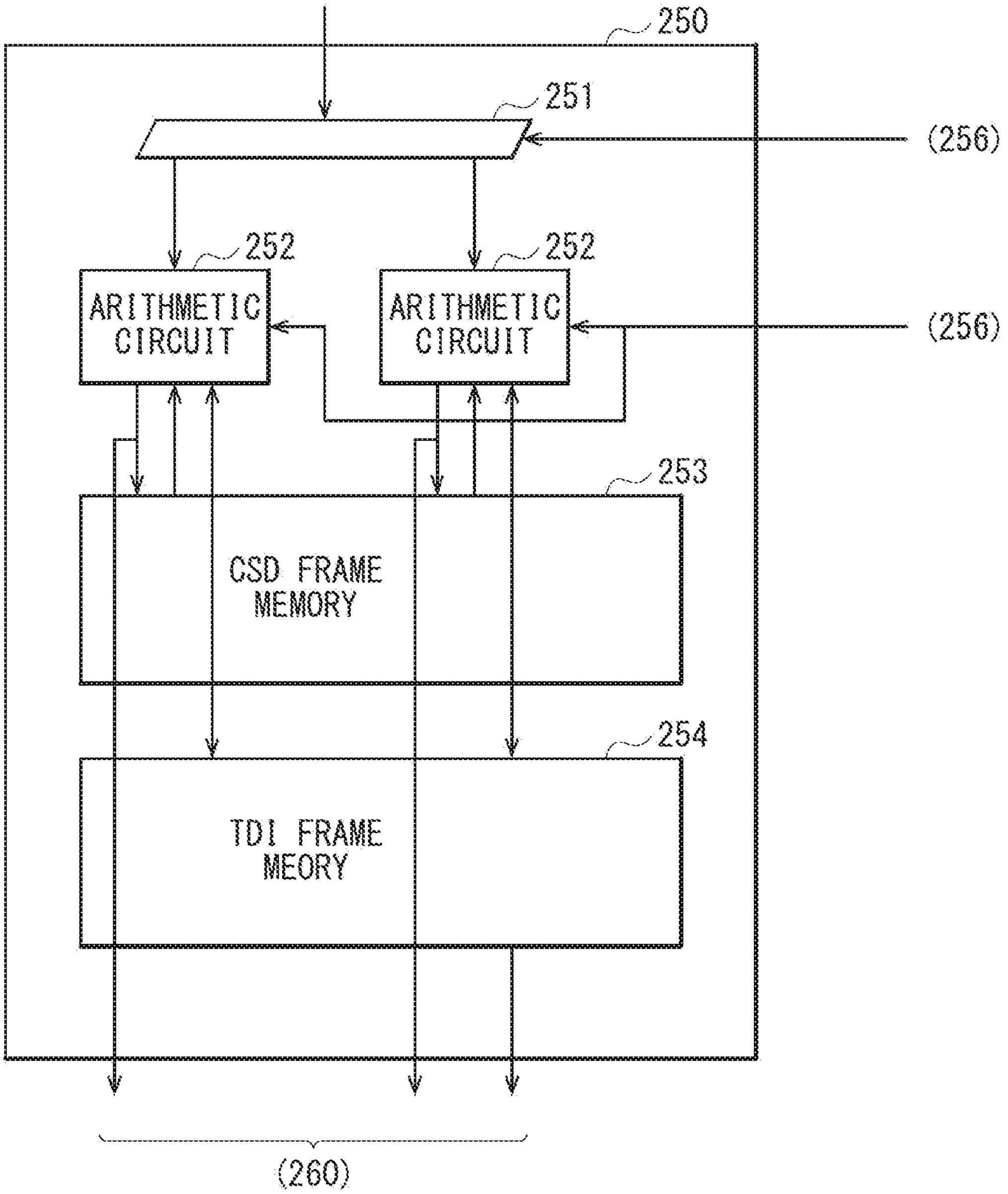

[ FIG. 9 ]
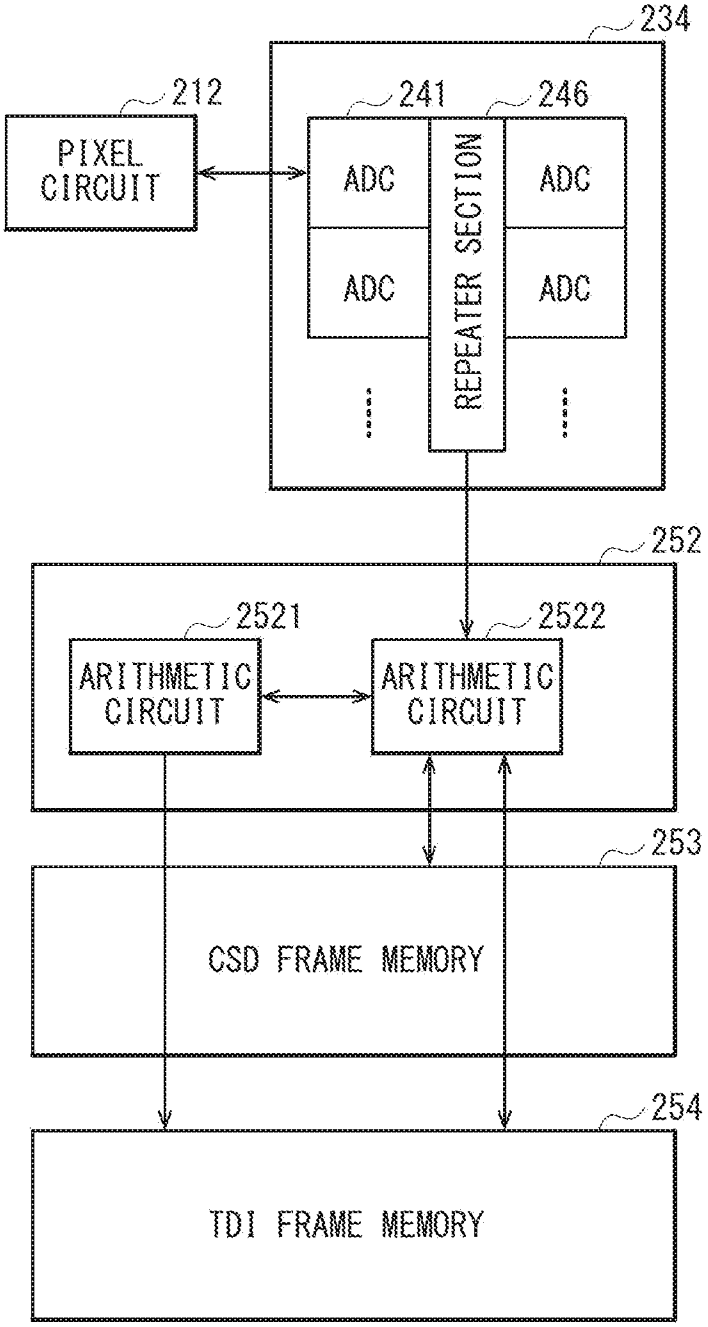

[ FIG. 10 ]
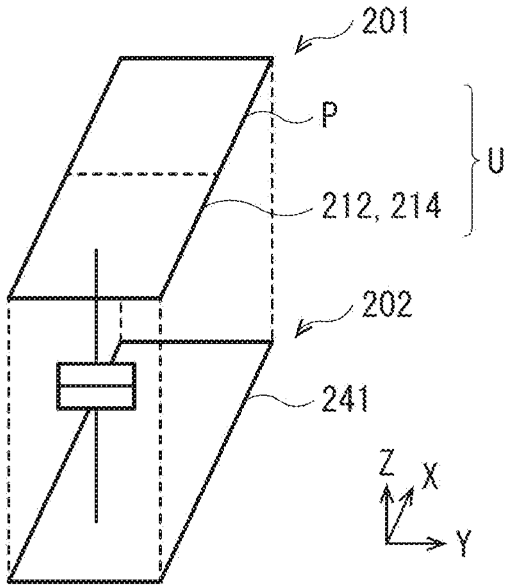
[ FIG. 11 ]
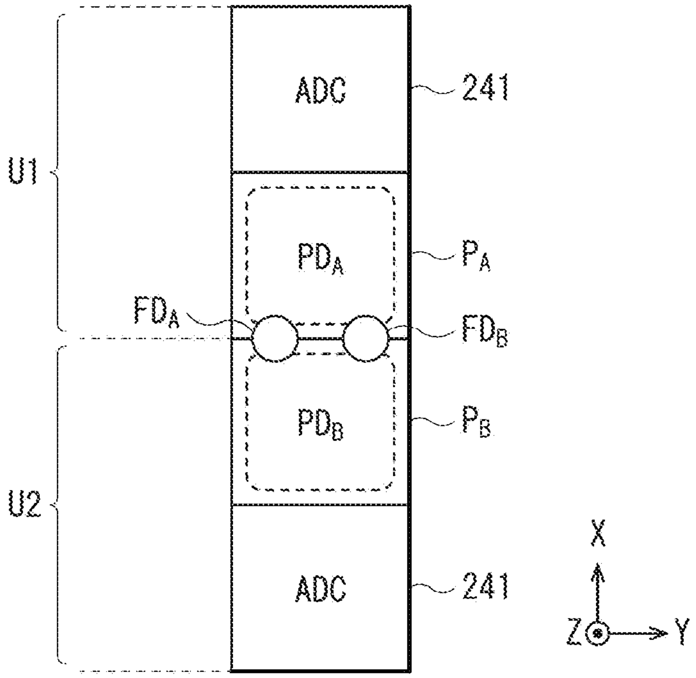

[ FIG. 12 ]
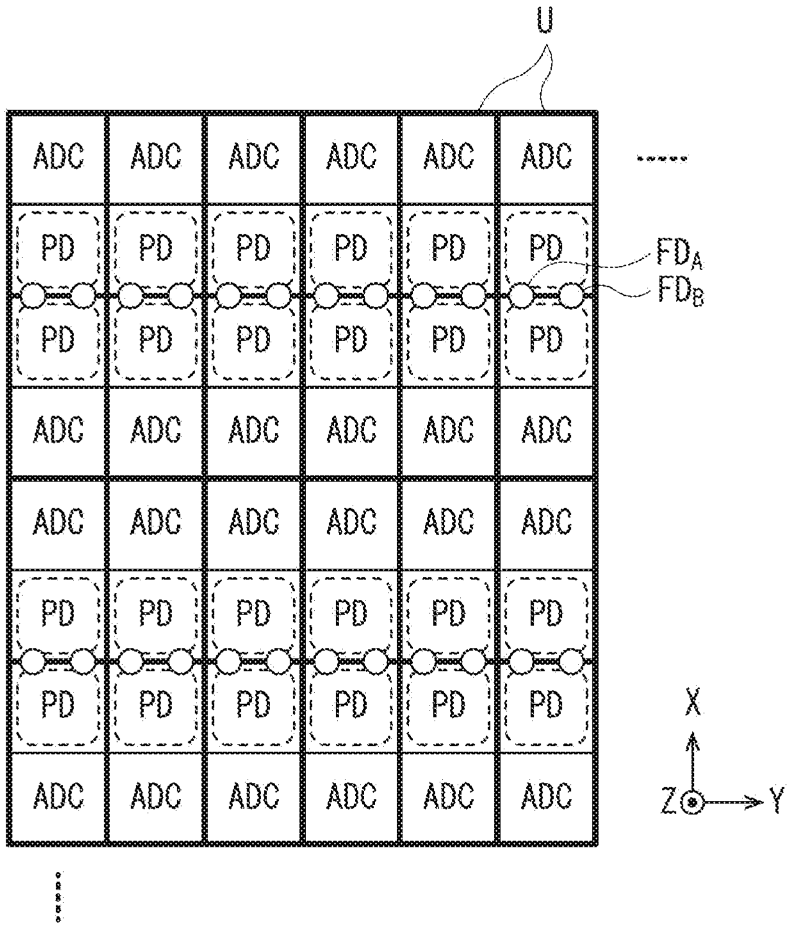

[ FIG. 15 ]
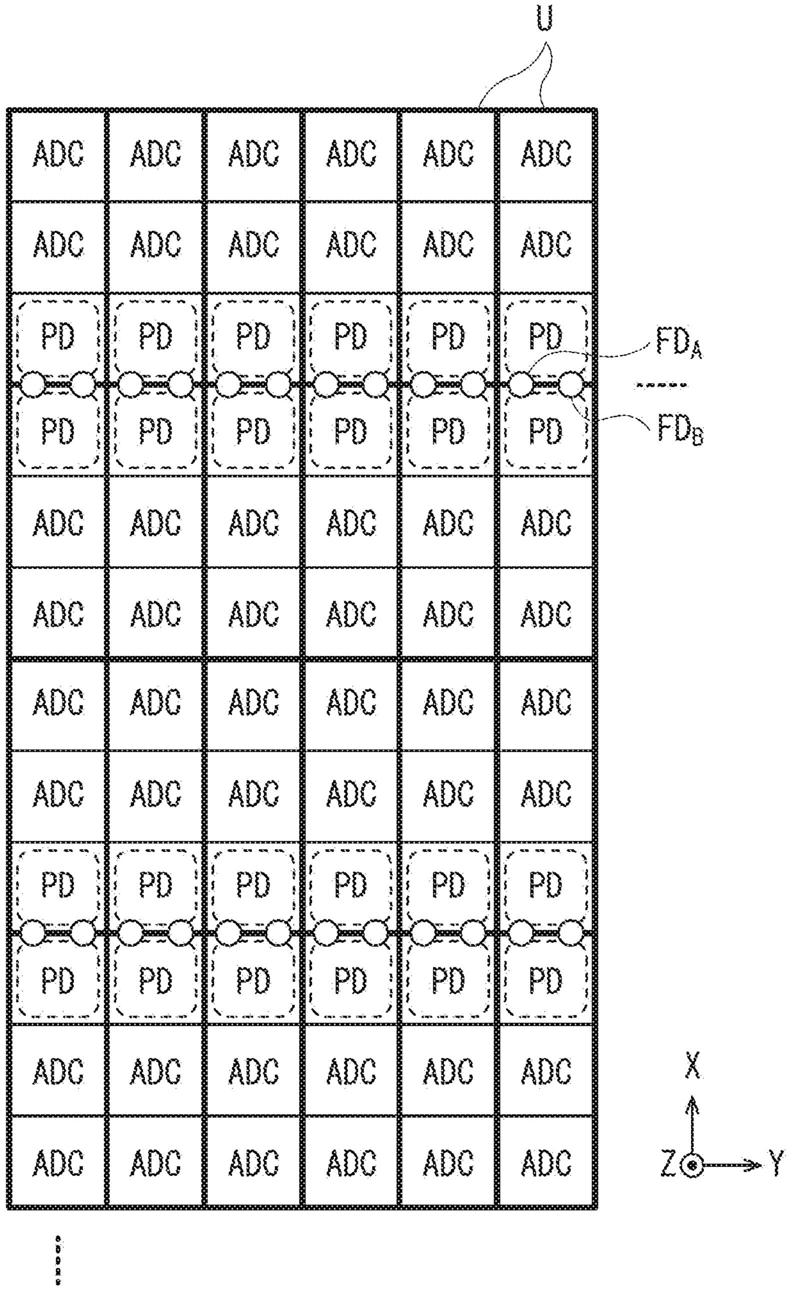

[ FIG. 16 ]
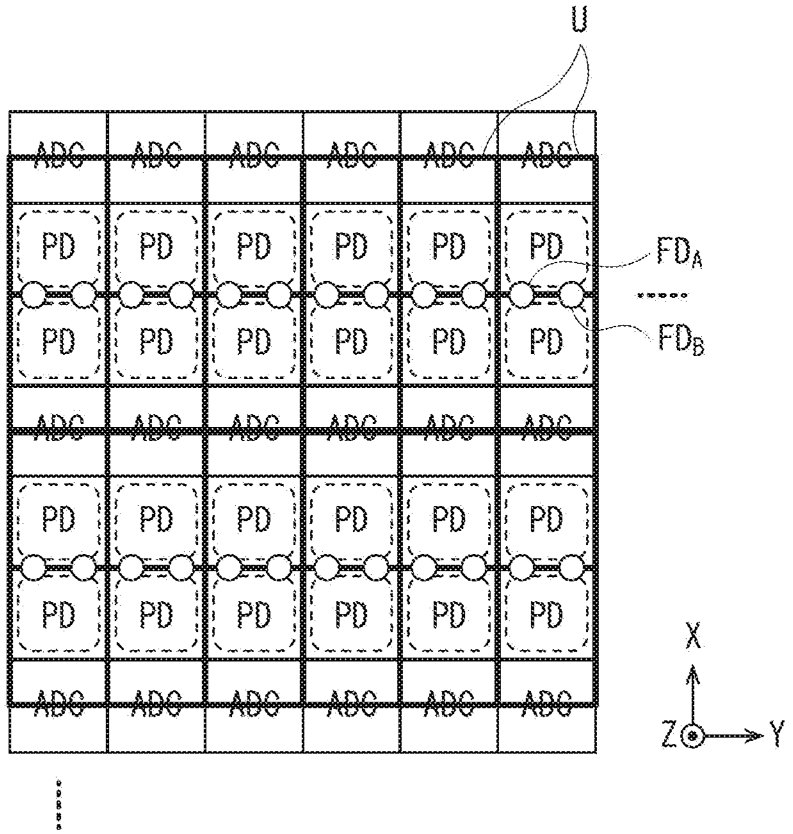
[ FIG. 17 ]
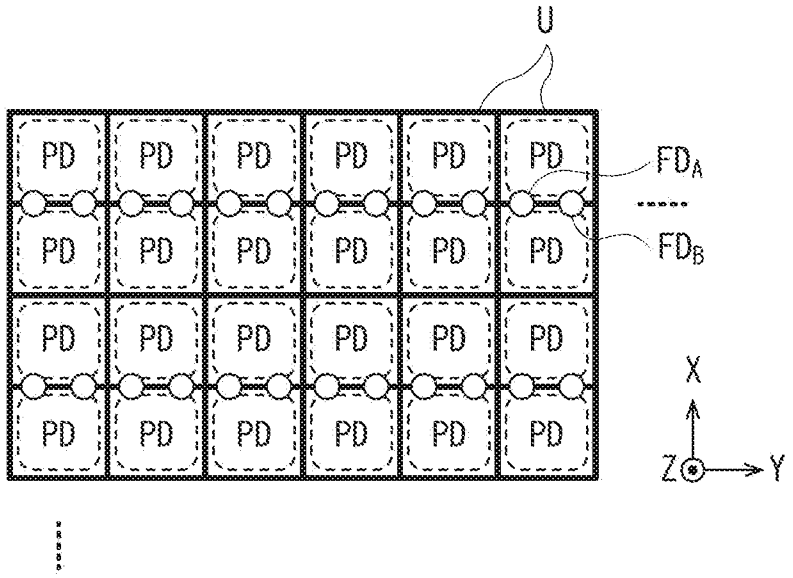

[ FIG. 18 ]
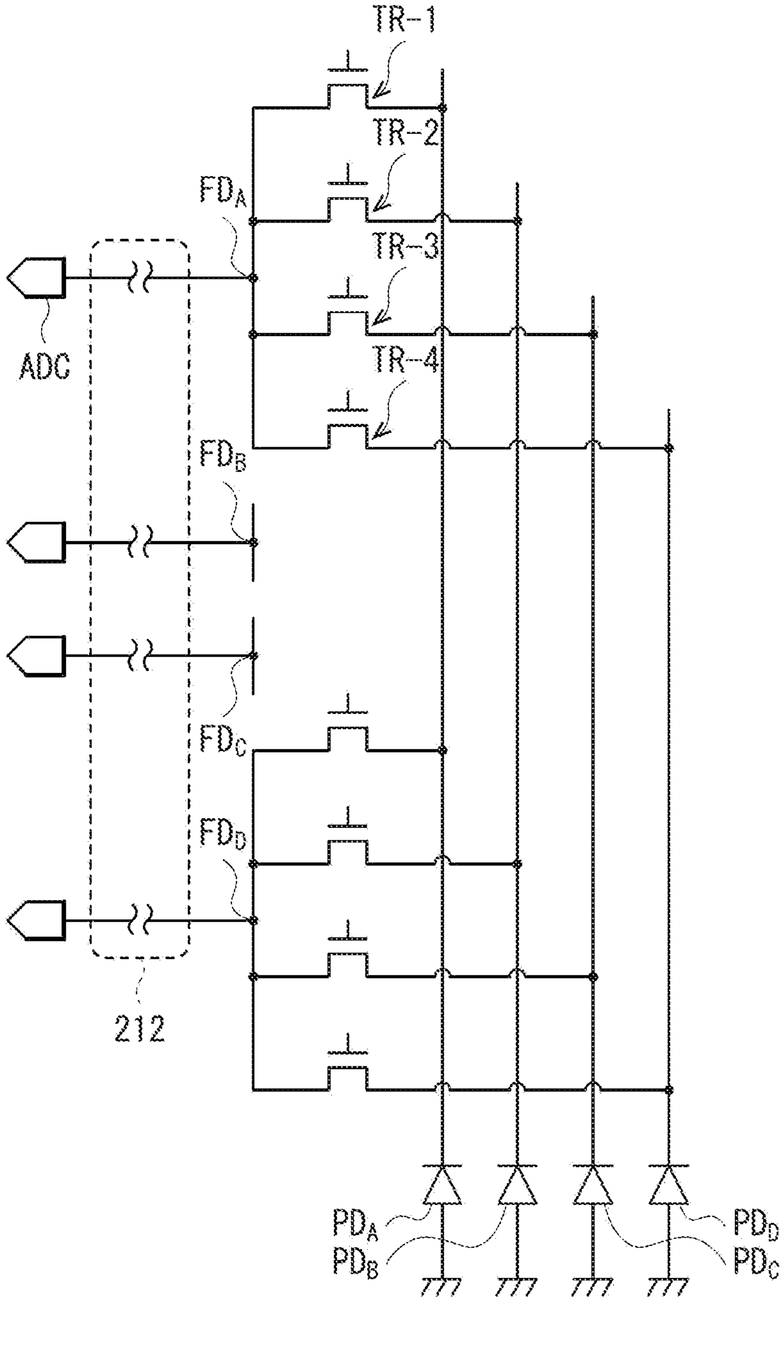

[ FIG. 19A ]
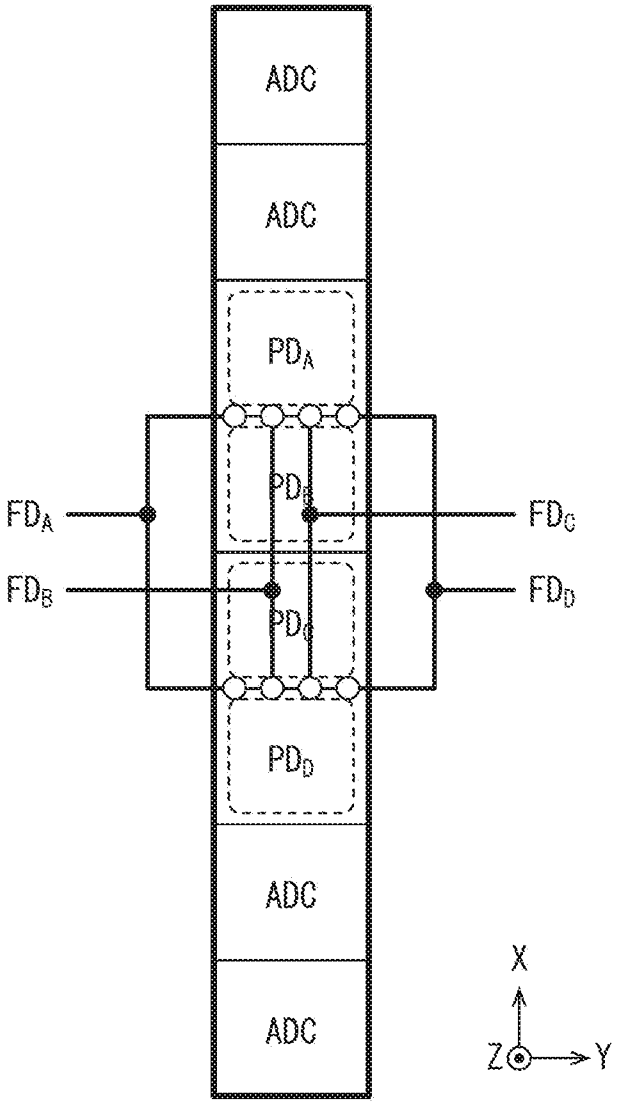

[ FIG. 19B ]
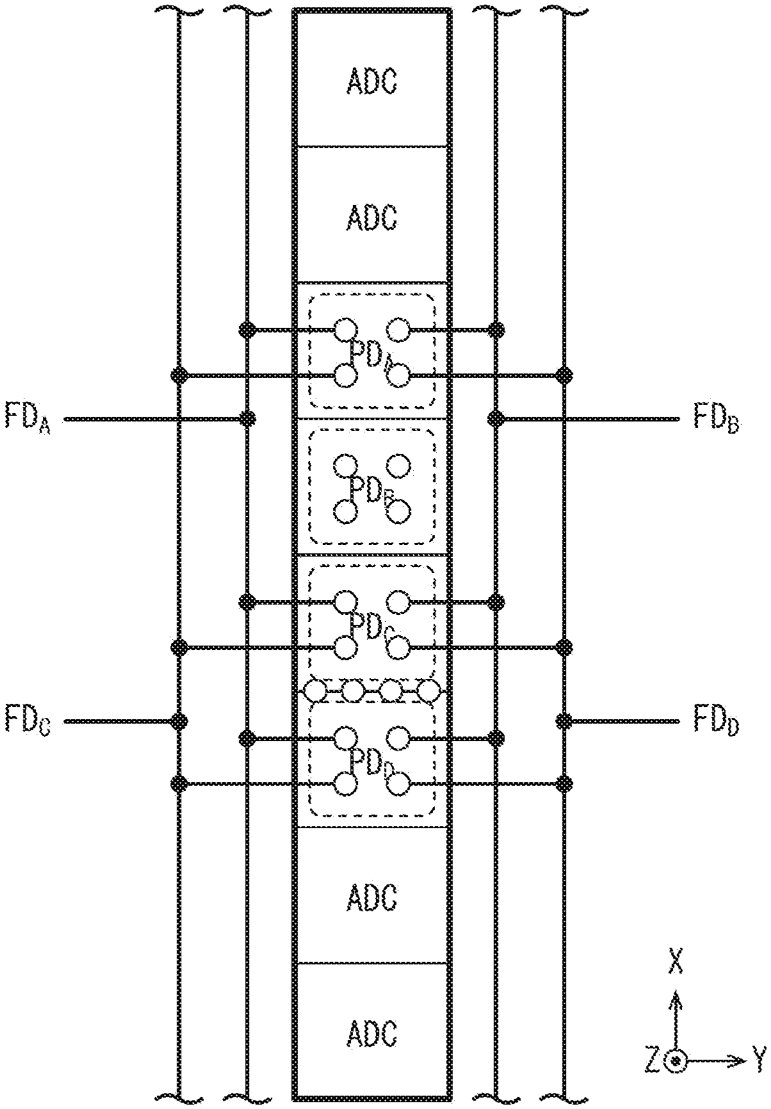

[ FIG. 21 ]
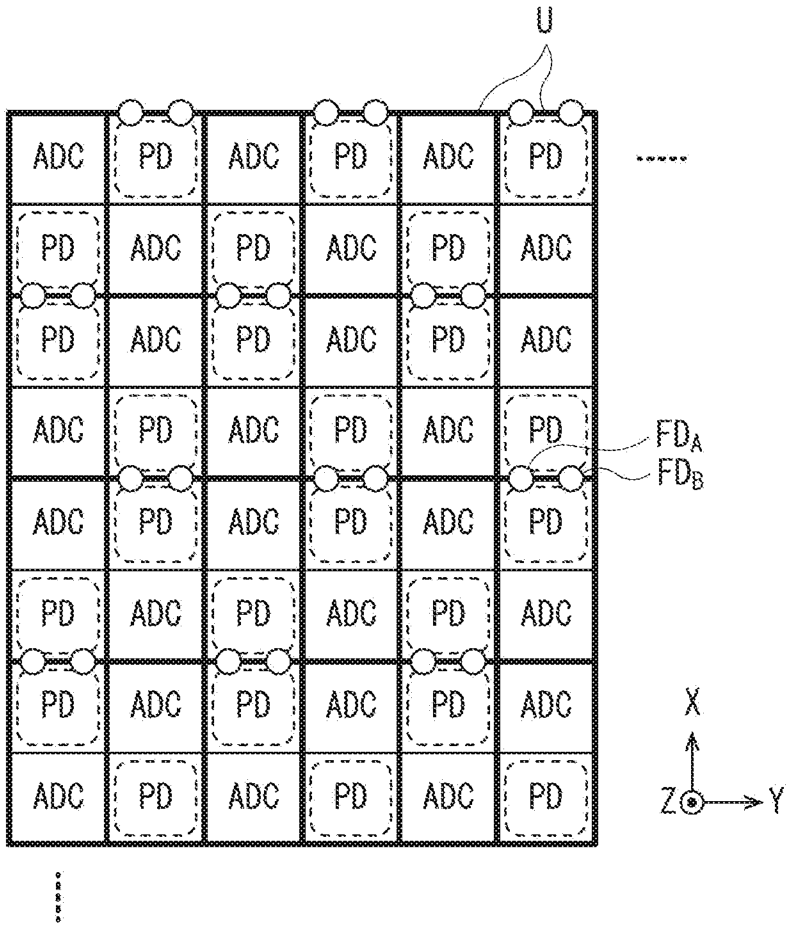

[ FIG. 22A ]
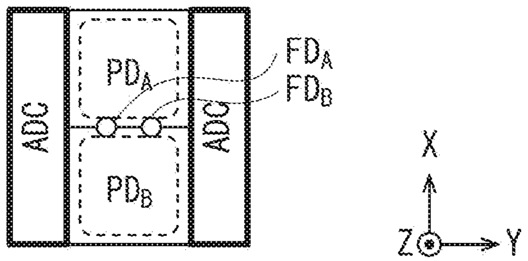
[ FIG. 22B ]
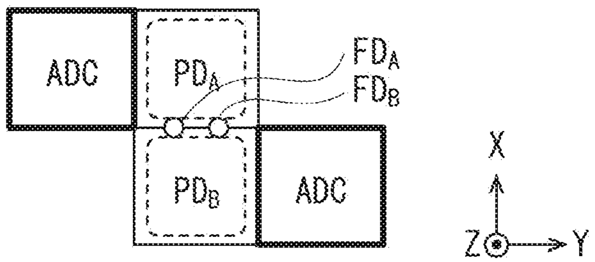
[ FIG. 22C ]
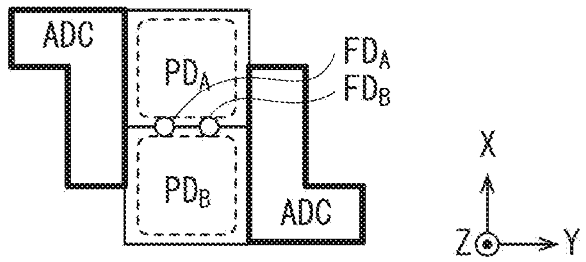
[ FIG. 22D ]
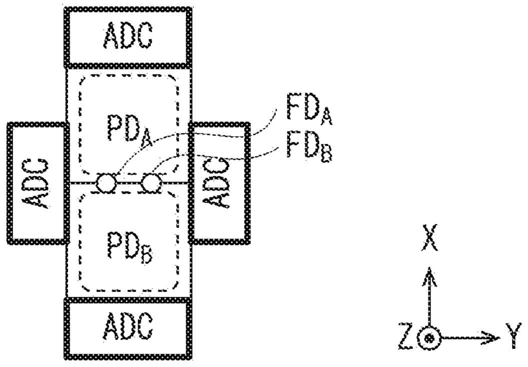

[ FIG. 23 ]
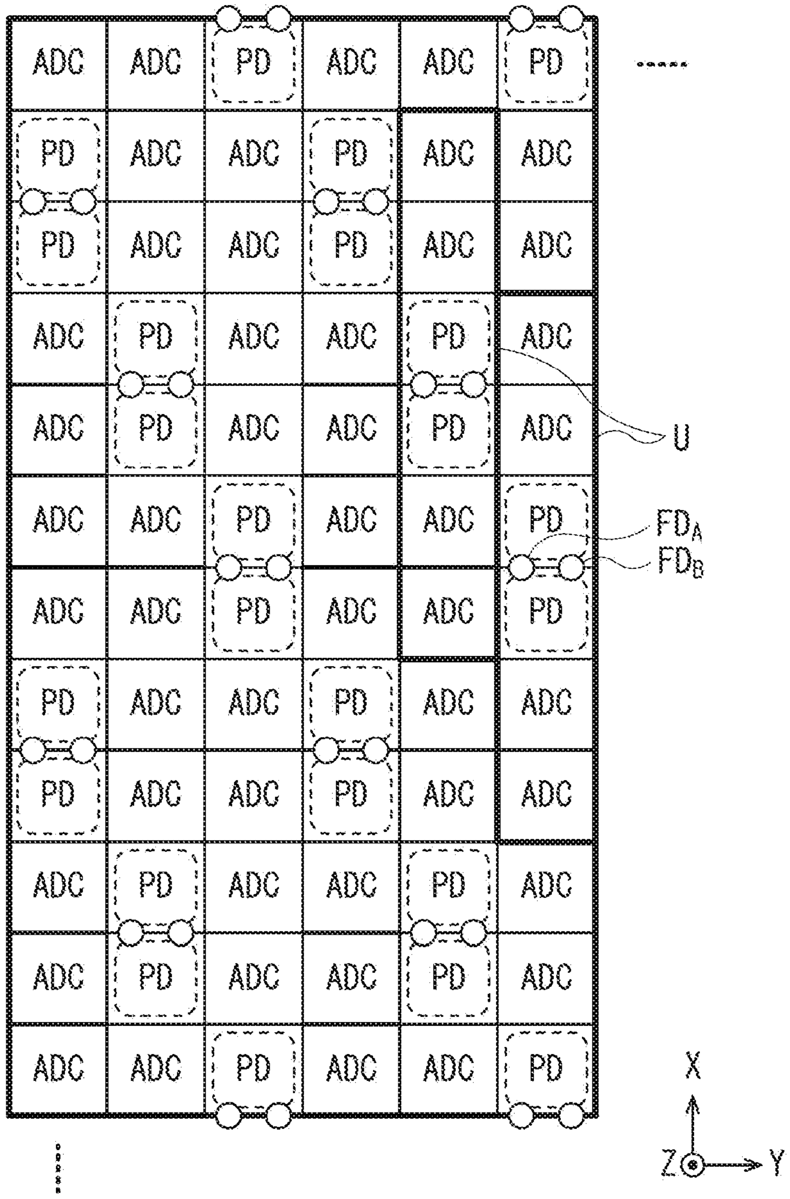

[ FIG. 25 ]

[ FIG. 27 ]
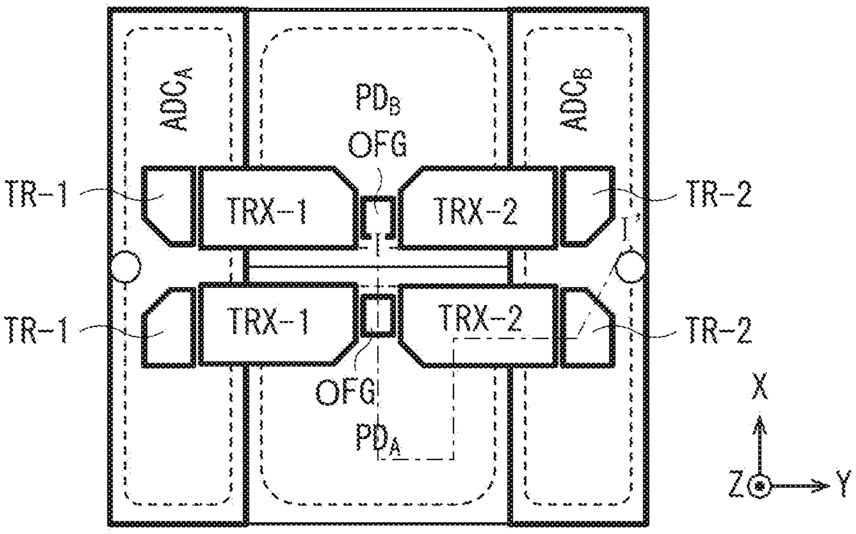
[ FIG. 28 ]
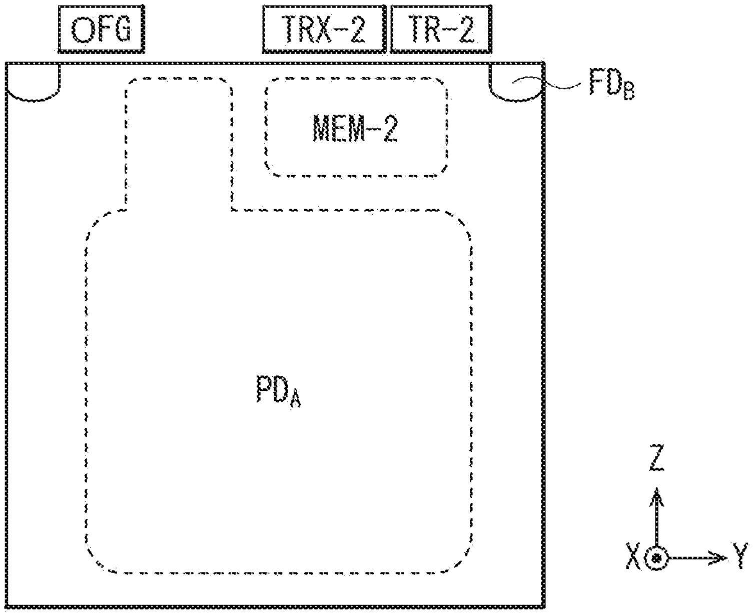

IMAGING DEVICE AND ELECTRONIC APPARATUS

TECHNICAL FIELD

The present disclosure relates to, for example, an imaging device that performs analog-to-digital conversion on a pixel to pixel basis, and an electronic apparatus including the imaging device.

BACKGROUND ART

For example, PTL 1 discloses a solid-state imaging sensor including a correlated double sampling circuit, a time-delay-integration frame memory, and a TDI circuit. The correlated double sampling circuit generates a frame in which a predetermined number of lines, each including a plurality of digital signals, are arrayed. The TDI frame memory holds a $K^{-1st}$ frame generated earlier than a $K^{th}$ frame (K being an integer). The TDI circuit performs TDI processing that adds a line at a predetermined address within the $K^{th}$ frame and a line a certain distance away from a predetermined address within a $K^{-1st}$ frame.

CITATION LIST

Patent Literature

PTL 1: Japanese Unexamined Patent Application Publication No. 2021-34862

SUMMARY OF THE INVENTION

Now, in an imaging device used as a linear sensor, a reduction in chip cost and power consumption is demanded.

It is thus desirable to provide an imaging device and an electronic apparatus that make it possible to reduce the chip cost and the power consumption.

An imaging device according to one embodiment of the present disclosure includes one or more light receiving pixels that generate electric charges according to an amount of received light through photoelectric conversion; one or more analog-to-digital conversion circuits that are provided for each of the light receiving pixels and that convert an analog signal read from each of the one or more light receiving pixels into a digital signal; and a plurality of pixel units each including the one or more light receiving pixels and the one or more analog-to-digital conversion circuits. The plurality of pixel units is disposed to allow the one or more light receiving pixels to be adjacent to each other in two pixel units that are adjacent to each other in a first direction.

An electronic apparatus according to one embodiment of the present disclosure includes the above-described imaging device according to one embodiment of the present disclosure.

In the imaging device according to the one embodiment and the electronic apparatus according to the one embodiment of the present disclosure, the one or more analog-to-digital conversion circuits provided for each of the light receiving pixels, and the one or more light receiving pixels in the two pixel units that are adjacent to each other in the first direction, among the plurality of pixel units each including the one or more light receiving pixels and the one or more analog-digital-conversion circuits, are disposed to be adjacent to each other. This reduces frame memory.

BRIEF DESCRIPTION OF DRAWING

FIG. 1 is a block diagram illustrating a schematic configuration of an imaging device according to an embodiment of the present disclosure.

FIG. 2 is a diagram describing an example of use of the imaging device illustrated in FIG. 1.

FIG. 3 is a schematic diagram illustrating an example of a stacking structure of an imaging sensor illustrated in FIG. 1.

FIG. 4 is a block diagram illustrating an example of a configuration of a light receiving chip illustrated in FIG. 3.

FIG. 5 is a block diagram illustrating an example of a configuration of a circuit chip illustrated in FIG. 3.

FIG. 6 is a block diagram illustrating an example of a configuration of a pixel AD converter illustrated in FIG. 5.

FIG. 8 is a schematic diagram illustrating an example of a configuration of the imaging sensor (pixel unit) illustrated in FIG. 1.

FIG. 9 is a planar schematic diagram illustrating an example of an array unit in a pixel array section of the pixel unit illustrated in FIG. 8.

FIG. 10 is a diagram illustrating an example of a layout of the pixel array section of the pixel unit in FIG. 9.

FIG. 11 is an equivalent circuit diagram of two pixel units illustrated in FIG. 9.

FIG. 12 is a block diagram illustrating one example of a configuration of a signal processing circuit illustrated in FIG. 5.

FIG. 15 is a diagram illustrating an example of an array unit of pixel units U and a layout of a pixel array section in an imaging sensor according to the Modification Example 1 of the present disclosure.

FIG. 16 is a diagram illustrating another example of the array unit of the pixel units U and the layout of the pixel array section in the imaging sensor according to the Modification Example 1 of the present disclosure.

FIG. 17 is a diagram illustrating other example of the array unit of the pixel units U and the layout of the pixel array section in the imaging sensor according to the Modification Example 1 of the present disclosure.

FIG. 18 is an equivalent circuit diagram of an array unit of pixel units in an imaging sensor according to Modification Example 2 of the present disclosure.

FIG. 19A is a schematic diagram illustrating an example of a wiring layout of the pixel unit in the array unit illustrated in FIG. 18.

FIG. 19B is a schematic diagram illustrating another example of the wiring layout of the pixel unit in the array unit of illustrated in FIG. 18.

FIG. 21 is a diagram illustrating an example of an array unit of pixel units U and a layout of a pixel array section in an imaging sensor according to the Modification Example 3 of the present disclosure.

FIG. 22A is a diagram illustrating an example of the layout of the ADC in the array unit of the pixel unit illustrated in FIG. 21.

FIG. 22B is a diagram illustrating another example of the layout of the ADC in the array unit of the pixel unit illustrated in FIG. 21.

FIG. 22C is a diagram illustrating other example of the layout of the ADC in the array unit of the pixel unit illustrated in FIG. 21.

FIG. 22D is a diagram illustrating other example of the layout of the ADC in the array unit of the pixel unit illustrated in FIG. 21.

FIG. 23 is a diagram illustrating another example of the array unit of the pixel unit and an example of the layout of the pixel array section in the imaging sensor according to Modification Example 3 of the present disclosure.

FIG. 27 is a diagram illustrating an example of a planar layout of a light receiving pixels that constitute the pixel units illustrated in FIG. 26.

FIG. 28 is a schematic diagram illustrating an example of a cross-sectional configuration of the imaging sensor corresponding to line I-I' illustrated in FIG. 27.

MODES FOR CARRYING OUT THE INVENTION

Figure 7:
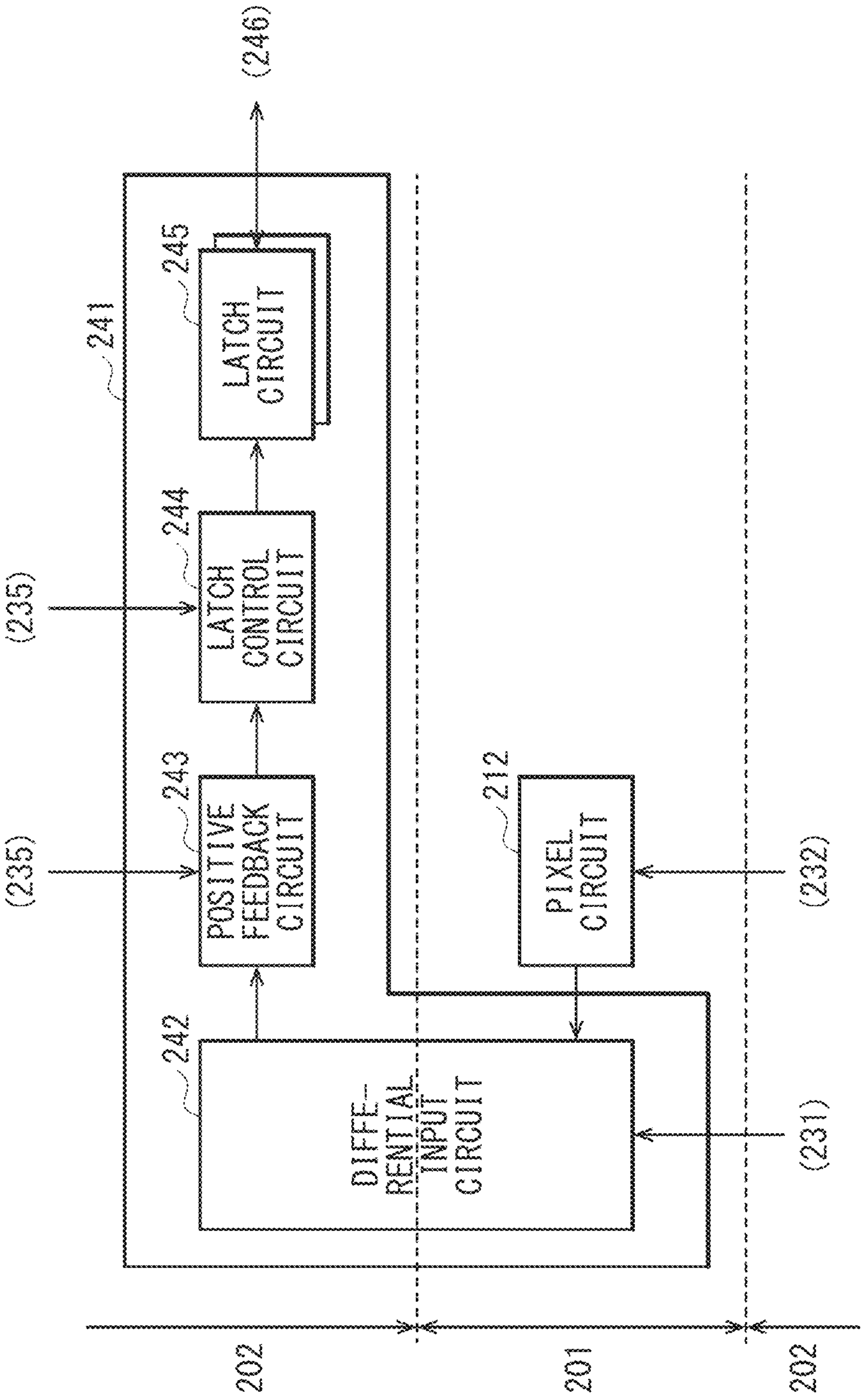
FIG. 7 is a block diagram illustrating an example of a configuration of an ADC illustrated in FIG. 6.

In the following, one embodiment of the present disclosure will be described in detail with reference to the drawings. The following description is a specific example of the present disclosure, and the present disclosure is not limited to the following modes. In addition, the present disclosure is not limited to the arrangement, dimensions, dimension ratios, and the like of components illustrated in each drawing. It is to be noted that the description will be given in the following order.

1. Embodiment (Example of an imaging device sharing two FDs between pixels that are adjacent to each other in one direction)
2. Modification Example 1 (Another example of a configuration of a pixel unit)
3. Modification Example 2 (Other example of the configuration of the pixel unit)
4. Modification Example 3 (Other example of the configuration of the pixel unit)
5. Modification Example 4 (Other example of the configuration of the pixel unit)
6. Modification Example 5 (Other example of the configuration of the pixel unit)

1. First Embodiment

FIG. 1 illustrates an example of a configuration of an imaging device (imaging device 1) according to the one embodiment of the present disclosure. The imaging device 1 is a device that captures image data and includes, for example, an optical unit 100, an imaging sensor 200, a storage unit 300, a control unit 400, and a communication unit 500.

The optical unit 100 collects incoming light and guides the light to the imaging sensor 200. The imaging sensor 200 captures image data. The imaging sensor 200 supplies the image data to the storage unit 300 via a signal line.

The storage unit 300 stores the image data. The control unit 400 controls the imaging sensor 200 to cause the imaging sensor 200 to capture the image data. The control unit 400, for example, supplies the imaging sensor 200 with a vertical synchronization signal VSYNC that indicates a timing of imaging via the signal line.

The communication unit 500 reads the image data from the storage unit 300 and transmits the image data to outside.

FIG. 2 illustrates an example of using the imaging device 1 illustrated in FIG. 1. As illustrated in FIG. 2, for example, the imaging device 1 is used in a factory having a belt conveyor 600, or the like.

The belt conveyor 600 moves a subject 610 in a predetermined direction (for example, in a direction of an arrow in FIG. 2) at a constant speed. The imaging device 1 is fixed near the belt conveyor 600 and captures an image of the subject 610 to generate image data. The generated image data is used, for example, in an inspection on whether or not there is a defect. This achieves factory automation (FA).

Note that the imaging device 1 is not limited to this configuration. The imaging device 1 may have, for example, a configuration in which the imaging device 1 moves with respect to a subject at a constant speed to capture an image, such as in aerial shooting.

[Configuration of Imaging Sensor]

FIG. 3 illustrates an example of a stacking structure of the imaging sensor 200 illustrated in FIG. 1. The imaging sensor 200 has a configuration, for example, in which a light receiving chip 201 and a circuit chip 202 are stacked. The light receiving chip 201 and the circuit chip 202 are electrically coupled to each other via a connection such as a via. Note that it is possible to electrically couple the light receiving chip 201 and the circuit chip 202 using a Cu—Cu bond or a bump, or the like, in addition to the via.

FIG. 4 illustrates an example of a configuration of the light receiving chip 201 illustrated in FIG. 3. The light receiving chip 201 includes a pixel array section 210 and a peripheral circuit 220, for example.

In the pixel array section 210, a plurality of pixel circuits 212 is arrayed in a two-dimensional array. The pixel array section 210 is divided into a plurality of pixel blocks 211, for example. In each of these pixel blocks 211, the pixel circuits 212 are arrayed in four rows and two columns, for example.

In the peripheral circuit 220 is disposed a circuit or the like that supplies a DC (Direct Current) voltage, for example.

FIG. 5 illustrates an example of a configuration of the circuit chip 202 illustrated in FIG. 3. The circuit chip 202 includes a DAC (Digital to Analog Converter), a pixel drive circuit 232, a time code generator 233, a pixel AD converter 234, and a vertical scanning circuit 235. The circuit chip 202 further includes a control circuit 236, a signal processing circuit 250, and an image processing circuit 260, and an output circuit 237.

The DAC 231 The DAC 231 generates a reference signal by DA (Digital to Analog) conversion over a predetermined AD conversion period. For example, a saw blade like ramp signal is used as the reference signal. The DAC 231 supplies the reference signal to the pixel AD converter 234.

The time code generator 233 generates a time code indicating time within the AD conversion period. The time code generator 233 is realized by a counter, for example. For example, a gray code counter is used as the counter. The time code generator 233 supplies the time code to the pixel AD converter 234.

The pixel drive circuit 232 drives each of the pixel circuits 212 to generate an analog pixel signal.

The pixel AD converter 234 performs AD conversion that converts an analog signal (that is, a pixel signal) of each of the pixel circuits 212 into a digital signal. The pixel AD converter 234 is divided by a plurality of clusters 240. Each of the clusters 240 is provided for each of the pixel blocks 211 and converts an analog signal in the corresponding pixel block 211 into a digital signal.

The pixel AD converter 234 generates, as a frame, image data in which digital signals are arrayed through the AD conversion, and supplies the image data to the signal processing circuit 250. In this frame, a set of the digital signals arrayed in a horizontal direction is hereinafter referred to as a "line". Each line is assigned a row address that is an address indicating a position of the line in a vertical direction.

The vertical scanning circuit 235 drives the pixel AD converter 234 to cause the pixel AD converter 234 to perform the AD conversion.

The signal processing circuit 250 performs predetermined signal processing on frames. As the signal processing, various types of processing including CDS processing and TDI processing are performed. The signal processing circuit 250 supplies the processed frame to the image processing circuit 260.

The image processing circuit 260 performs predetermined image processing on the frame supplied from the signal processing circuit 250. As the image processing, image recognition processing, black level correction processing, image correction processing, or demosaic processing, or the like are performed. The image processing circuit 260 supplies the processed frame to the output circuit 237.

The output circuit 237 outputs the frame after being subjected to the image processing to the outside.

The control circuit 236 controls operation timings of the DAC 231, the pixel drive circuit 232, the vertical scanning circuit 235, the signal processing circuit 250, the image processing circuit 260, and the output circuit 237 in synchronization with the vertical synchronization signal VSYNC.

[Example of Configuration of Pixel AD Conversion Unit]

FIG. 6 illustrates an example of a configuration of the pixel AD converter 234 illustrated in FIG. 5. In this pixel AD converter 234, a plurality of ADCs 241 is arrayed in a two-dimensional array. The ADCs 241 are each disposed for each of the pixel circuit 212. For example, in a case where the pixel circuits 212 each have N rows (where N being an integer) and M columns (where M being an integer), the N×M ADCs 241 are disposed.

In each of the clusters 240, the same number of ADCs 241 as the number of the pixel circuits 212 in the pixel blocks 211 are disposed. For example, in a case where the pixel circuits 212 are arrayed in four rows and two columns in the pixel block 211, the ADCs 241 are also arrayed in four rows and two columns in the cluster 240.

The ADC 241 performs the AD conversion on the analog pixel signal generated by the corresponding pixel circuit 212. In the AD conversion, the ADC 241 compares the pixel signal with the reference signal and holds a time code when a result of the comparison is inverted. Then, the ADC 241 outputs the held time code as an AD converted digital signal.

A repeater section 246 is disposed for each column of the clusters 240. For example, in a case where the number of columns of the cluster 240 is M/2, M/2 repeater sections are disposed. The repeater section 246 transfers a time code. The repeater section 246 transfers the time code from the time code generator 233 to the ADC 241. The repeater section 246 also transfers a digital signal from the ADC 241 to the signal processing circuit 250. The transfer of the digital signal is also referred to as "reading" of the digital signal.

Note that numbers in parentheses in the figure represent an example of order of reading of digital signals of the ADC 241. For example, the digital signals in odd-numbered columns of a first row are read out first, and the digital signals in even-numbered columns of the first row are read out second. The digital signals in the odd-numbered columns on a second row are read out third, and the digital signals in the even-numbered columns on the second row are read out third. Thereafter, the digital signals in the odd-and even-numbered columns on respective rows are read out in sequence in a similar manner.

Also in FIG. 6, the example is illustrated in which the ADCs 241 are disposed for each of the pixel circuits 212, but the embodiment is not limited to this configuration. The configuration may be such that the plurality of pixel circuits 212 shares one ADC 241.

[Configuration of ADC]

FIG. 7 illustrates an example of the configuration of the ADC 241 illustrated in FIG. 6. The ADC 241 includes, for example, a differential input circuit 242, a positive feedback circuit 243, a latch control circuit 244, and a plurality of latch circuits 245.

Although details will be described below, the pixel circuit 212 and a portion of the differential input circuit 242 are disposed in the light receiving chip 201, and constitute a pixel unit U together with a light receiving pixel P. A remaining portion of the differential input circuit 242 and subsequent circuits is disposed in the circuit chip 202.

The differential input circuit 242 compares the pixel signal from the pixel circuit 212 with the reference signal from the DAC 231. This differential input circuit 242 supplies the positive feedback circuit 243 with a comparison result signal indicting a comparison result.

The positive feedback circuit 243 adds a portion of output to input (the comparison result signal) and supplies the latch control circuit 244 with the input as an output signal VCO.

The latch control circuit 244 causes the plurality of latch circuits 245 to hold the time code when the output signal VCO is inverted, according to a control signal×WORD from the vertical scanning circuit 235.

The latch circuits 245 hold the time code from the repeater section 246 according to control of the latch control circuit 244. The latch circuits 245 are provided for the number of bits of the time code. For example, in a case where the time code has 15 bits, 15 latch circuits 245 are provided in the ADCs 241. In addition, the held time code is read out by the repeater section 246 as the AD converted digital signal.

As described above, an ADC 51 converts the pixel signal from the pixel circuit into a digital signal.

[Example of Configuration of Signal Processing Circuit]

FIG. 8 illustrates an example of a configuration of the signal processing circuit 250 illustrated in FIG. 5. The signal processing circuit 250 includes a plurality of selectors 251, a plurality of arithmetic circuits 252, a CDS frame memory 253, and a TDI frame memory 254.

The selectors 251 are each disposed for each column of the cluster 240, in other words, for each of repeater sections 246. For example, in a case where two columns of the ADCs 241 are arrayed in the cluster 240, the selectors 251 are disposed in every two columns of the ADC 241. The arithmetic circuit 252 is disposed in every column of the ADC 241. For example, in case where there are M columns of the ADCs 241, M/2 selectors 251 and M arithmetic circuits 252 are disposed.

As described above, the repeater sections 246 output the digital signals in the odd-numbered columns and the digital signals in the even-numbered columns in sequence.

The selectors 251 select output destinations of the digital signals according to control of the control circuit 236. For example, in a case where the repeater sections 246 output the digital signals in the odd-numbered columns, the selectors 251 output the digital signals to the arithmetic circuits 252 corresponding to the odd-numbered columns, while in a case where the repeater sections 246 output the digital signals in the even-numbered columns, the selectors 251 output the digital signals to the arithmetic circuits 252 corresponding to the even-numbered columns.

The arithmetic circuits 252 perform the CDS processing and the TDI processing on the digital signals from the selectors 251.

Here, digital signals include P-phase level and D-phase level. The P-phase level represents level when the pixel circuit 212 is initialized by reset signals RSTs. In contrast, the D-phase level represents level according to an amount of exposure when electric charges are transferred by transfer signals TRs. The P-phase level is also referred to as reset level and the D-phase level is also referred to as signal level.

In the CDS processing, the M arithmetic circuits 252 causes the CDS frame memory 253 to hold a P-phase frame in which the P-phase levels are arrayed. Then, the M arithmetic circuits 252 determines a difference between the P-phase level and the D-phase level for every pixel, and generate a CDS frame in which difference data is arrayed.

Then, in the TDI processing, the M arithmetic circuits 252 cause the TDI frame memory 254 to hold a first CDS frame. Next, the M arithmetic circuits 252 add a line at a predetermined address in a second CDS frame after the CDS processing and a line at an address a certain distance away from a predetermined address in the first frame. The faster a moving distance of the subject is, the larger value is set for a distance between the addressed to be added. For example, “1” is set for the distance between the addresses to be added. In this case, adjacent lines are added together. In the second and subsequent frames, for the $K^{th}$ CDS frame (K being an integer), the $K^{-1st}$ CDS frame generated earlier than that frame is held in the TDI frame memory 254.

In addition, the M arithmetic circuits 252 supply the CDS frame and a TDI frame after being subjected to the TDI processing to the image processing circuit 260.

FIG. 9 is a diagram for describing calculation of the signal processing circuit 250 illustrated in FIG. 8.

Each of the plurality of pixel circuits 212 generates an analog pixel signal through photoelectric conversion and supplies the analog pixel signal to the pixel AD converter 234. In the pixel AD converter 234, the plurality of ADCs 241 is arranged in a two-dimensional array. The plurality of ADCs 241 converts the analog pixel signal into a digital signal and transfers the digital signal to the arithmetic circuits 252 via a repeater section 360. The digital signal has the reset level and the signal level according to the amount of exposure. Each of the ADCs 241 outputs the signal level following the reset level.

The CDS circuit 430 causes the CDS frame memory 440 to hold a first P-phase frame in which the P-phase levels are arrayed. When the D-phase level is inputted, the CDS circuit 430 reads out the P-phase frame from the CDS frame memory 440 and performs the CDS processing to determine the difference between the P-phase level and the D-phase level. Then, the CDS circuit 430 updates the CDS frame memory 440 with the first CDS frame after the CDS processing, and causes the TDI frame memory 450 to hold that CDS frame.

Then, the CDS circuit 430 causes the CDS frame memory 440 to hold a second P-phase frame. When the D-phase level is inputted, the CDS circuit 430 reads out the P-phase frame from the CDS frame memory 440, and performs the second CDS processing to determine the difference between the P-phase level and the D-phase level. Then, the CDS circuit 430 updates the CDS frame memory 440 with the second CDS frame after the CDS processing.

Subsequently, the TDI circuit 420 reads out a line at the predetermined address in the $K-1^{st}$ CDS frame from the TDI frame memory 450, and reads out, from the CDS frame memory 440, a line at an address a certain distance away from (for example, adjacent to) the predetermined address in the $K^{th}$ frame. Then, the TDI circuit 420 adds those lines and updates the TDI frame memory 450 with the added lines.

In third and subsequent frames, processing similar to the processing for the second frame as described above will be repeatedly performed. In the third and subsequent frames, however, the number of lines to be integrated increases by one line. The number of integrations increases until a certain number of times (four times, for example) is reached. Such processing generates a TDI frame in which integration data is arrayed.

[Configuration of Pixel Unit]

FIG. 10 illustrates an example of a configuration of the pixel unit U. As described above, the pixel circuits 212 and the portion of the ADC 241 (the portion of the differential input circuits 242, for example) are provided in the light receiving chip 201 together with the light receiving pixel P. The pixel unit U includes the light receiving pixel P and a circuit section in which the portion of the ADC 241 is provided. The light receiving pixel P and the circuit section (hereinafter referred to as the ADC 241) have approximately same formed area and are provided side by side in the moving direction of the subject (the X-axis direction, for example).

Figure 13:
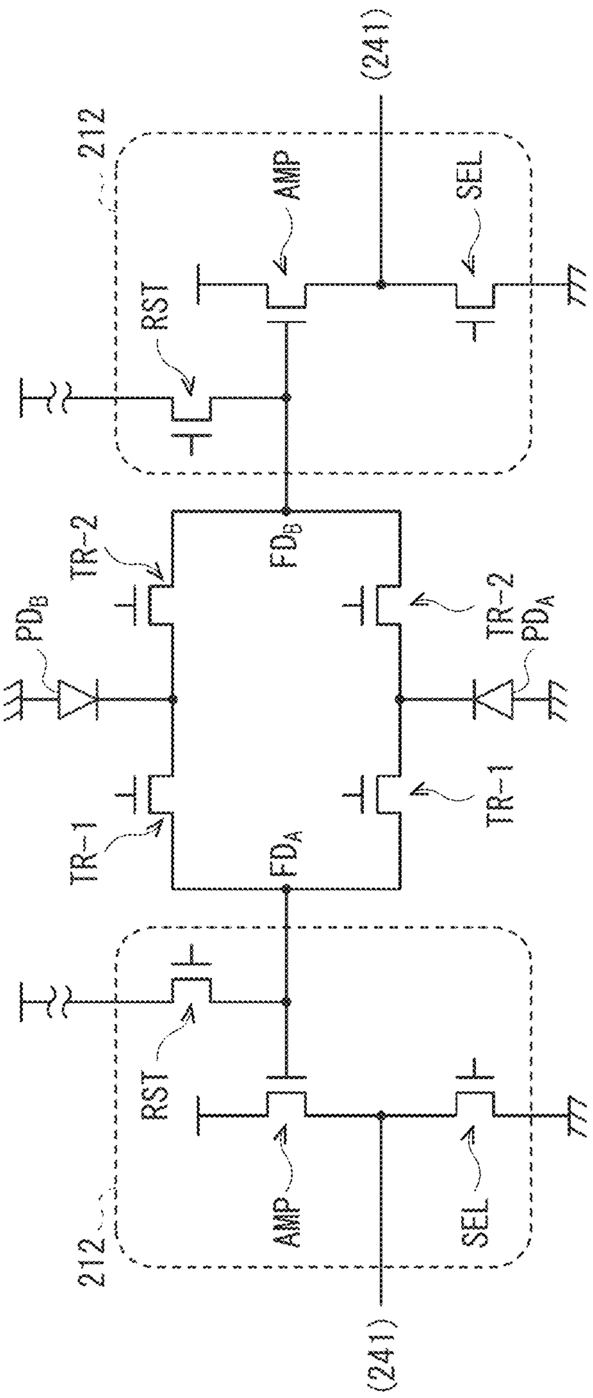
FIG. 13 is a timing chart illustrating an example of an operation of the imaging sensor illustrated in FIG. 3.

FIG. 11 illustrates an example of an array unit when the pixel units U are arrayed in the pixel array section 210. FIG. 12 illustrates an example of a layout of the pixel array section 210 of the pixel unit U illustrated in FIG. 11. FIG. 13 illustrates an example of a configuration of the pixel circuits 212 of the two pixel units U illustrated in FIG. 11.

In the pixel array section 210, a plurality of pixel units is arrayed in a two-dimensional array, with the two pixel units U adjacent to each other in the X-axis direction as one array unit. Two pixel units U1 and U2 that constitute the array unit are disposed so that respective light receiving pixels $P_A$ and $P_B$ are adjacent to each other, as illustrated in FIG. 11. In other words, in the two pixel units U1 and U2 that constitute the array unit, $P_A$ and $P_B$ as well as the ADCs 241 provided the respective $P_A$ and $P_B$ are laid out so as to be mirror-inverted with respect to each other.

In the pixel array section 210, a plurality of the array units including the pixel units U1 and U2 is arrayed in the X-axis direction and a Y-axis direction. That is, in the array unit being adjacent to each other in the X-axis direction, the ADCs 241 are disposed to be adjacent to each other. In the Y-axis direction, the respective light receiving pixel P and the ADC 241 are adjacent to each other.

The light receiving pixels $P_A$ and $P_B$ have components that are common to each other. In the following, in order to distinguish the components of the light receiving pixels $P_A$ and $P_B$ from each other, an identification code A is attached to an end of codes of the components of the light receiving pixels $P_A$, and an identification code B is attached to the end of codes of the components of the light receiving pixel $P_B$. In a case where it is not necessary to distinguish the components of the light receiving pixels $P_A$ and $P_B$ from each other, the identification codes at the end of the codes of the light receiving pixels $P_A$ and $P_B$ are omitted.

The light receiving pixels $P_A$ and $P_B$ each have, for example, one photodiode PD, two transfer transistors TR-1 and TR-2, a floating diffusion layer FD, a reset transistor RST, an amplification transistor AMP, and a selection transistor SEL. For example, an nMOS (n-channel Metal Oxide Semiconductor) transistor is used as the transfer transistors TR-1 and TR-2, the reset transistor RST, the amplification transistor AMP, and the selection transistor SEL.

The photodiode PD generates electric charges through photoelectric conversion.

The transfer transistors TR-1 and TR-2 transfer the electric charges from the photodiode PD to the floating diffusion layer FD according to transfer signals TXs from the pixel drive circuit 232.

The floating diffusion layer FD accumulates the transferred electric charges and generates a voltage according to the amount of electric charges.

The reset transistor RST initializes the floating diffusion layer FD according to the reset signals RSTs from the pixel drive circuit 232.

A gate electrode and a drain electrode of the amplification transistor AMP being coupled to the floating diffusion layer FD and the power source unit, respectively, the amplification transistor AMP serves as an input section of a so-called source follower circuit that is a readout circuit for voltage signals held by the floating diffusion layer FD.

When selection signals SELs from the pixel drive circuit 232 are applied, the selection transistor SEL enters a conductive state, and the light receiving pixel P enters a selected state.

In the present embodiment, as described above, the two pixel units U1 and U2 that constitute the array unit are disposed so that the respective light receiving pixels $P_A$ and $P_B$ are adjacent to each other. At the boundaries of the adjacent light receiving pixels $P_A$ and $P_B$ are respectively disposed the floating diffusion layers $FD_A$ and $FD_B$ of the light receiving pixels $P_A$ and $P_B$. The floating diffusion layers $FD_A$ and $FD_B$ are shared by the light receiving pixels $P_A$ and $P_B$, respectively. That is, the electric charges generated in the respective light receiving pixels $P_A$ and $P_B$ are transferred to the floating diffusion layers $FD_A$ and $FD_B$, respectively.

[Example of Operations of Imaging Sensor]

Figure 14:
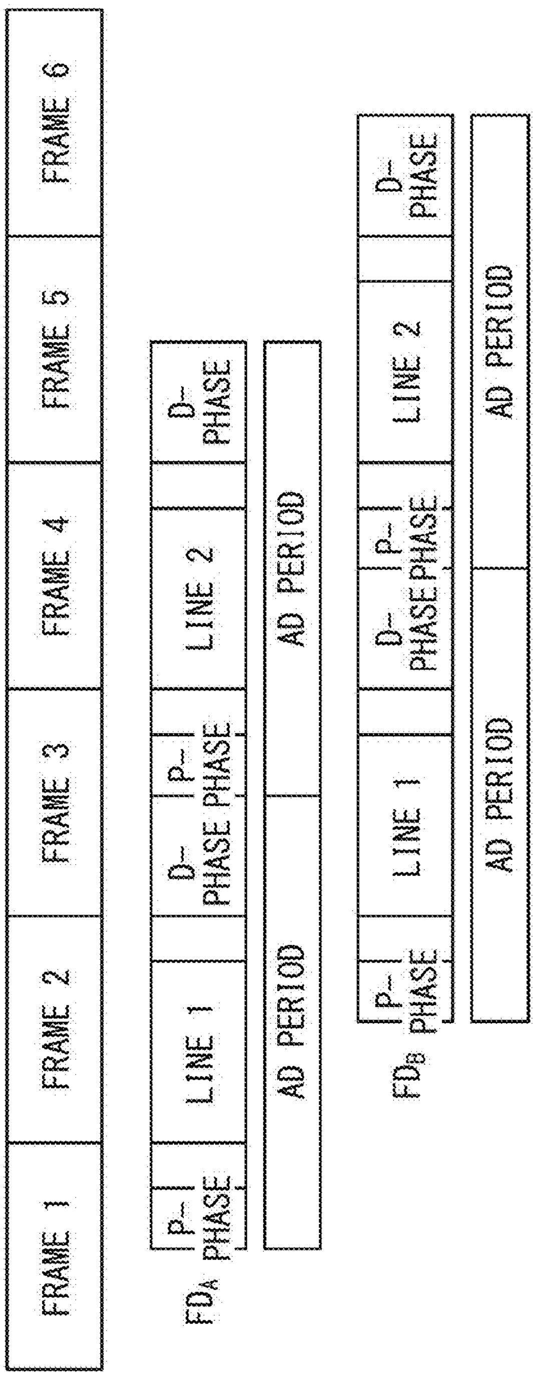
FIG. 14 is a diagram describing calculation of the signal processing circuit illustrated in FIG. 12.

FIG. 14 is a timing chart illustrating an example of an operation of the imaging sensor 200. In the present embodiment, each of the light receiving pixels P has two output destinations. For example, the electric charges generated in the light receiving pixel PA is transferred to each of the floating diffusion layers $FD_A$ and $FD_B$. The pixel circuit 212 and an ADC 231 are coupled to each of the floating diffusion layers $FD_A$ and $FD_B$. As a result, time necessary for processing by one ADC circuit is two frame periods.

The light receiving pixels $P_A$ and $P_B$ that share the floating diffusion layers $FD_A$ and $FD_B$ are disposed adjacently in the moving direction (X-axis direction) of the subject. That is, the light receiving pixels $P_A$ and $P_B$ have mutually different exposure timings. The electric charges generated in the respective light receiving pixels $P_A$ and $P_B$ are analog-added in the floating diffusion layers $FD_A$ and $FD_B$, respectively, and thereafter read out to the pixel circuits 212.

For example, the electric charges generated in the light receiving pixel $P_A$ are transferred to the floating diffusion layer $FD_A$ in frame 1 (P-phase), and the electric charges transferred to the floating diffusion layer $FD_A$ are held during frame 2. Thereafter, in frame 3, a voltage corresponding to a voltage of the floating diffusion layer $FD_A$ is outputted as a pixel voltage (D-phase). During this time, the analog signal (that is, the pixel signal) of each of the pixel circuits 212 is converted into a digital signal. In addition, the electric charges generated in the light receiving pixel $P_A$ are transferred to the floating diffusion layer $FD_B$ (in P-phase) in the frame 2, and the electric charges transferred to the floating diffusion layer $FD_B$ are held during the frame 3. Subsequently, in frame 4, a voltage corresponding to a voltage of the floating diffusion layer $FD_B$ is outputted as the pixel voltage (D-phase). During this time, the analog signal (that is, the pixel signal) of each of the pixel circuits 212 is converted into a digital signal.

For example, the electric charges generated in the light receiving pixel $P_B$ are transferred to the floating diffusion layer $FD_A$ in the frame 3 (P-phase) and the electric charges transferred to the floating diffusion layer $FD_A$ are held in the frame 4. Subsequently, in frame 5, a voltage corresponding to the voltage of the floating diffusion layer $FD_A$ is outputted as the pixel voltage (D-phase). During this time, the analog signal (that is, the pixel signal) of each of the pixel circuits 212 is converted into a digital signal. In addition, the electric charges generated in the light receiving pixel $P_B$ are transferred to the floating diffusion layer $FD_B$ in the frame 4 (P-phase) and the electric charges transferred to the floating diffusion layer $FD_B$ are held in the frame 5. Subsequently, in frame 6, a voltage corresponding to the voltage of the floating diffusion layer $FD_B$ is outputted as the pixel voltage (D-phase). During this time, the analog signal (that is, the pixel signal) of each of the pixel circuits 212 is converted into a digital signal.

[Workings and Effects]

In the imaging device 1 of the present embodiment, the light receiving pixels P and the ADCs 241 constitute the pixel units U that are provided side by side in the moving direction (the X-axis direction, for example) of the subject, and the light receiving pixels P are disposed so as to be adjacent to each other in the two pixel units that are adjacent to each other in the X-axis direction. This reduces the frame memory.

In the TDI addition processing, pieces of data that are captured at shifted timings are added. Therefore, a frame memory in accordance with the number of added frames (also referred to as the number of TDI stages) is necessary. Because frame memory occupies a large area on a chip, a large volume of the frame memory being necessary leads to a large chip size and increased chip cost. Moreover, the power consumption necessary for operations of the frame memory is not small relative to the whole, which also makes an impact.

In contrast, in the present embodiment, the light receiving pixels P are disposed to be adjacent to each other in the two pixel units that are adjacent to each other in the X-axis direction. As a result, some TDI addition targets are first added in an electric charge state and then AD converted, and the remaining TDI addition targets are subjected to digital-TDI addition. This makes it possible to reduce the frame memory to be used during the digital addition.

Specifically, in the pixel units U in which the light receiving pixels P and the ADCs 241 are disposed side by side in the moving direction (the X-axis direction, for example) of the subject, the two floating diffusion layers $FD_A$ and $FD_B$ provided in the respective light receiving pixels $P_A$ and $P_B$ are shared between the pixel units U that are adjacent to each other in the X-axis direction. Signals of the respective light receiving pixels $P_A$ and $P_B$ are added in these two floating diffusion layers $FD_A$ and $FD_B$ and digital-converted in the ADCs 241 coupled to the respective floating diffusion layers $P_A$ and $P_B$. This realizes original TDI operation. Therefore, it becomes possible to halve the frame memory.

As described above, the imaging device 1 of the present embodiment makes it possible to reduce the chip cost and the power consumption.

Furthermore, in the imaging device 1 of the present embodiment, if the frame rate (scan rate) is same, it is possible to perform the AD conversion, taking twice as long. In addition, using same time processing as a general imaging device makes it possible to double the scan rate.

Next, a description will be given of Modification Examples 1 to 5 of the present disclosure. In the following, components similar to the components of the above-described embodiment are noted by same reference numerals and a description of those components will be omitted appropriately.

2. Modification Example 1

FIG. 15 illustrates an example of an array unit of pixel units U in the imaging sensor 200 and a layout of the pixel units U in the pixel array section 210 according to the Modification Example 1 of the present disclosure. FIG. 16 illustrates another example of the array unit of the pixel units U in the imaging sensor 200 and the layout of the pixel units U in the pixel array section 210 according to Modification Example 1 of the present disclosure. FIG. 17 illustrates other example of the array unit of the pixel units U in the imaging sensor 200 and the layout of the pixel units U in the pixel array section 210 according to Modification Example 1 of the present disclosure.

In the above embodiment, the example is illustrated in which the light receiving pixels P and the ADCs 241 having approximately the same formed area are provided side by side in the moving direction (the X-axis direction, for example) of the subject, but the present disclosure is not limited to this.

The formed area of the ADC 241 may be, for example, an integral multiple of the formed area of the light receiving pixel P. As illustrated in FIG. 15, for example, the formed area of the ADC 241 may be twice or three times or more than the formed area of the light receiving pixel The formed area of the ADC 241 may be such that a total formed area of the ADCs 241 of the adjacent pixel units U is, for example, an integral multiple of the formed area of the light receiving pixels P. That is, the formed area of the ADCs 241 may be ½ relative to the formed area of the light receiving pixels P, as illustrated in FIG. 16, for example.

In addition, in a case where the ADCs 241 are all provided on side of the circuit chip 202, it is possible to remove the formed area of the ADCs 241 in the light receiving chip 201, as illustrated in FIG. 17, for example.

3. Modification Example 2

FIG. 18 is an equivalent circuit diagram of an array unit of the pixel units U in the imaging sensor 200 according to Modification Example 2 of the present disclosure. FIG. 19A illustrates an example of an array unit and a wiring layout of the pixel units illustrated in FIG. 18. FIG. 19B illustrates another example of the array unit and the wiring layout of the pixel units illustrated in FIG. 18.

In the above embodiment, the example is illustrated in which the pixel unit U has the one light receiving pixel P, but the number of the light receiving pixels P that constitute the pixel unit U is not limited to this.

The number of the light receiving pixels P that constitute the pixel unit U may include two or more light receiving pixels P. FIG. 18 illustrates an example of a configuration of the pixel circuit 212 in a case where the two pixel units U each having the two light receiving pixels P are set as one array unit.

Each of the two pixel units U1 and U2 that constitute the array unit has the two light receiving pixels $P_A$ and $P_B$ as well as light receiving pixels $P_C$ and $P_D$. In the two pixel units U1 and U2 that constitute the array unit, the light receiving pixels $P_A$, $P_B$, $P_C$, and $P_D$ are disposed adjacently in this order in the X-axis direction. In the light receiving pixels $P_A$, $P_B$, $P_C$, and $P_D$, the floating diffusion layers $FD_A$, $FD_B$, $FD_C$, and $FD_D$ are provided.

As illustrated in FIG. 19A, for example, the floating diffusion layers $FD_A$, $FD_B$, $FD_C$, and $FD_D$ are disposed at the boundary between the light receiving pixels $P_A$ and the light receiving pixel $P_B$, as well as at the boundary between the light receiving pixel $P_C$ and the light receiving pixel $P_D$, respectively. In that case, wiring as illustrated in FIG. 19A, for example, allows the floating diffusion layers $FD_A$, $FD_B$, $FD_C$, and $FD_D$ located at the respective boundaries to be shared among the four light receiving pixels $P_A$, $P_B$, $P_C$, and $P_D$.

Alternatively, the floating diffusion layers $FD_A$, $FD_B$, $FD_C$, and $FD_D$ may be disposed in each of the light receiving pixels $P_A$, $P_B$, $P_C$, and $P_D$, as illustrated in FIG. 19B, for example. In that case, wiring as illustrated in FIG. 19B, for example, allows the floating diffusion layers $FD_A$, $FD_B$, $FD_C$, and $FD_D$ located at the respective boundaries to be shared among the four light receiving pixels $P_A$, $P_B$, $P_C$, and $P_D$.

Figure 20:
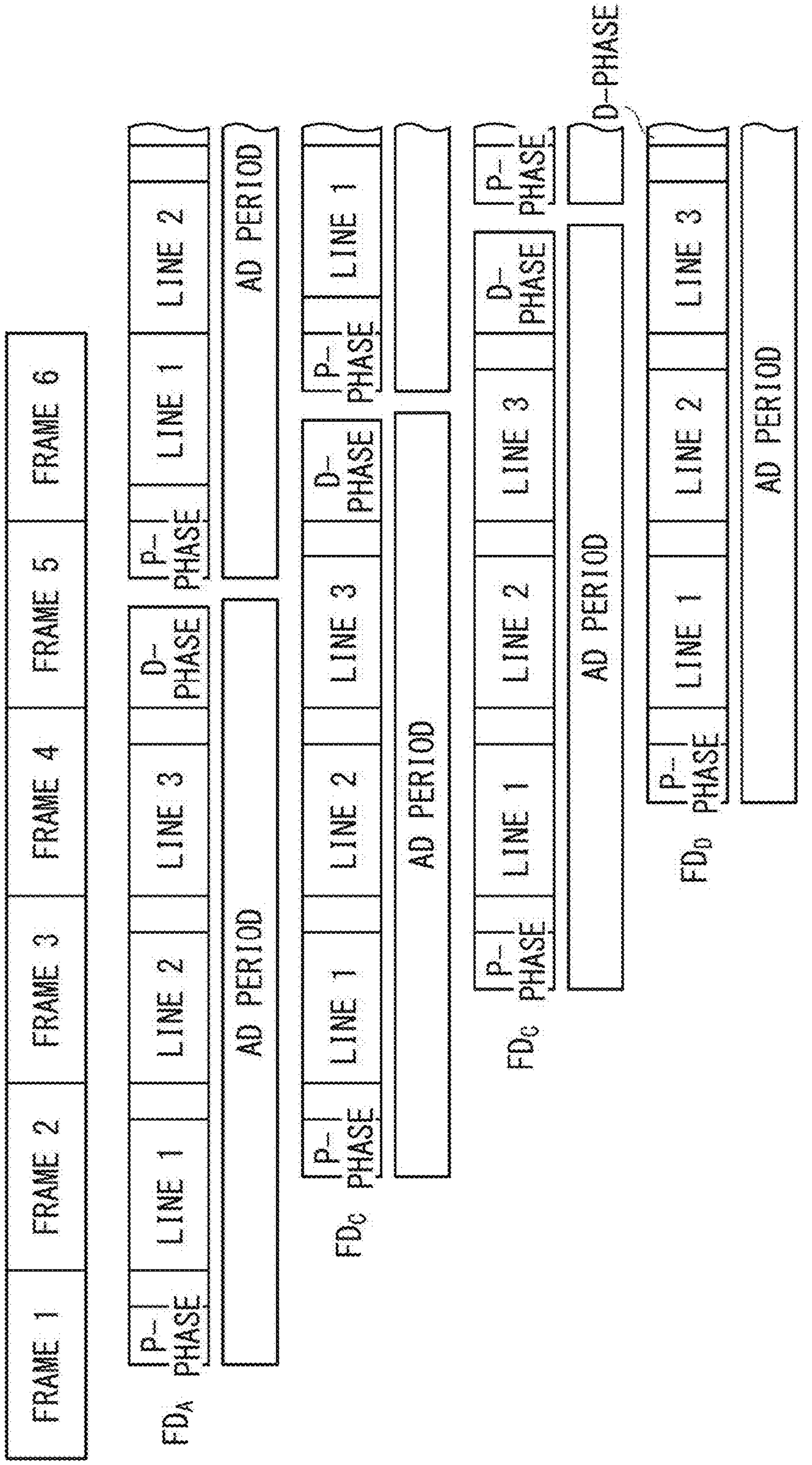
FIG. 20 is a timing chart illustrating an example of an operation of the imaging sensor illustrated in FIG. 18.

FIG. 20 is a timing chart illustrating an example of an operation of the imaging sensor 200 of this modification example. In this modification example, each of the light receiving pixels $P_A$, $P_B$, $P_C$, and $P_D$ has four output destinations. The pixel circuit 212 and the ADC 231 are coupled to each of the floating diffusion layers $FD_A$, $FD_B$, $FD_C$, and $FD_D$. As a result, the time necessary for processing by the one ADC circuit is four frame periods.

In this manner, in this modification example, the four light receiving pixels $P_A$, $P_B$, $P_C$, and $P_D$ are disposed adjacently as the array unit when arrayed in the pixel array section 210, so that the four floating diffusion layers $FD_A$, $FD_B$, $FD_C$, and $FD_D$ are shared. This makes it possible to further extend the AD period even though the number of the floating diffusion layers FD and the transfer transistors TR disposed in one pixel is increased to four, for example.

4. Modification Example 3

FIG. 21 illustrates an example of an array unit of pixel units U in the imaging sensor 200 and a layout of the pixel units U in the pixel array section 210 according to the Modification Example 3 of the present disclosure.

In the above embodiment, the example is illustrated in which the respective light receiving pixel P and the ADCs 241 are disposed adjacent to each other in the Y-axis direction, but a layout of the array unit including the two pixel units U is not limited to this.

As illustrated in FIG. 21, for example, in the Y-axis direction, the array unit including the two pixel units U may be disposed being offset to the X-axis direction, for example, by the light receiving pixels P that constitute the pixel units U. That is, the ADCs 241 may be disposed adjacent to the light receiving pixels P in the Y-axis direction.

In addition, as illustrated in FIG. 21, in a case where the ADCs 241 are disposed next to the light receiving pixels P, it is possible to appropriately change the layout of the ADCs 241 in each of the pixel units U.

For example, as illustrated in FIG. 22A, the ADCs 241 may be disposed by ½ width of the light receiving pixel P on both sides of the array unit including the two pixel units U.

For example, as illustrated in FIG. 22B, the ADCs 241 corresponding to the formed area of the light receiving pixels P may be disposed on one or the other of the two pixel units U that constitute the array unit, in the Y-axis direction.

For example, as illustrated in FIG. 22C, the ADCs 241 may be disposed in an L-shape on one or other of the two pixel units U that constitute the array unit in the Y-axis direction.

For example, as illustrated in FIG. 22D, the ADCs 241 may be divided so as to correspond to the formed area of the light receiving pixels P and disposed on the two pixel units U that constitute the array unit both in the X-axis direction and in the Y-axis direction.

Note that in FIG. 21, the example is illustrated in which the light receiving pixels P and the ADCs 241 having approximately the same formed area are provided side by side, for example, in the moving direction (the X-axis direction, for example) of the subject, but the present disclosure is not limited to this. For example, as illustrated in FIG. 23, the ADC 241 may be disposed adjacently to the array unit including the two pixel units U, each having the ADC 241, in the Y-axis direction of the light receiving pixel P, the ADC 241 having the formed area twice as large as the light receiving pixel P.

5. Modification Example 4

Figure 24:
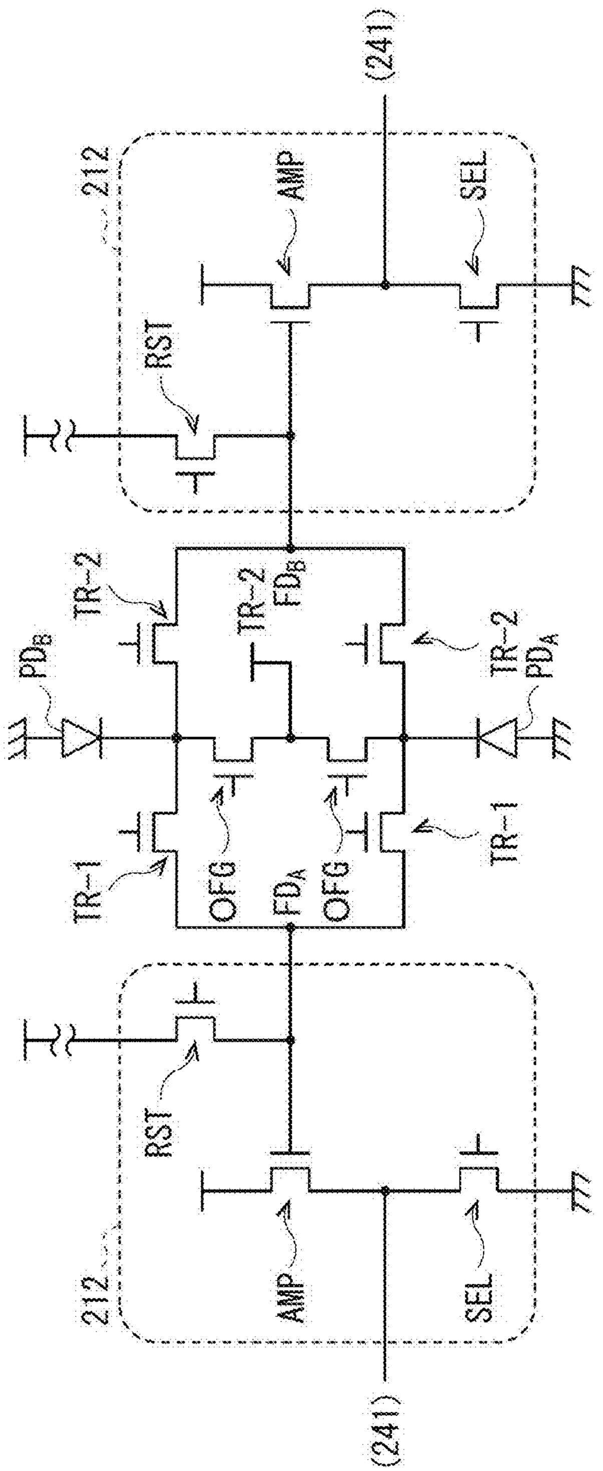
FIG. 24 is an equivalent circuit diagram of an array unit of pixel units in an imaging sensor according to Modification Example 4 of the present disclosure.
Figure 25:
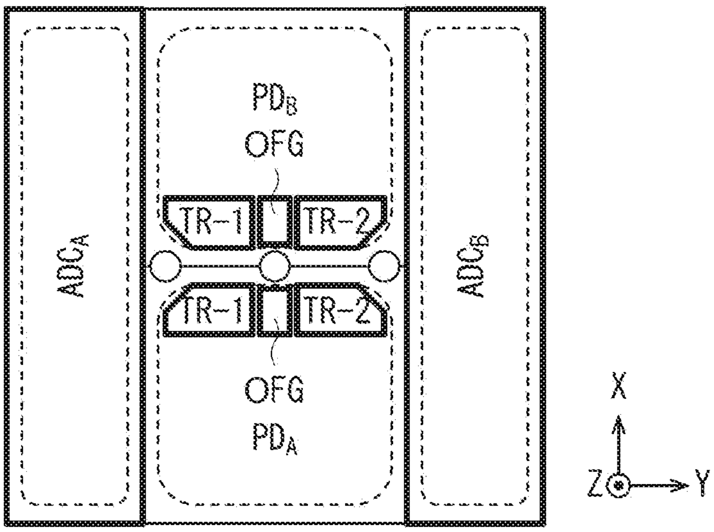
FIG. 25 is a diagram illustrating an example of a planar layout of light receiving pixels that constitute the pixel units illustrated in FIG. 24.

FIG. 24 is an equivalent circuit diagram of an array unit of the pixel units U in the imaging sensor 200 according to Modification Example 4 of the present disclosure. FIG. 25 illustrates an example of a layout of the pixel units U in the array unit illustrated in FIG. 24.

A discharge transistor OFG may be provided in each of the light receiving pixels P that constitute the pixel unit U. The discharge transistor OFG discharges electric charges accumulated in the photodiode PD according to drive signals OFGs from the pixel drive circuit 232.

This allows the imaging sensor 200 of this modification example to reset the photodiode PD at any timing. That is, it becomes possible to optionally set the exposure time.

6. Modification Example 5

Figure 26:
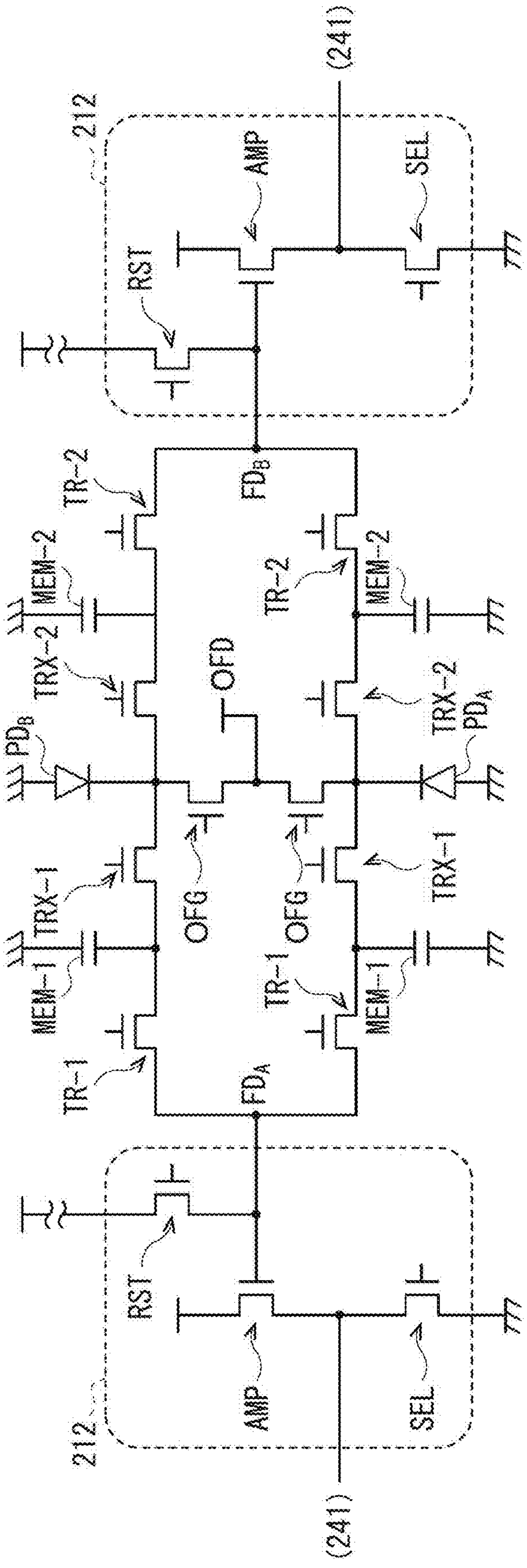
FIG. 26 is an equivalent circuit diagram of an array unit of pixel units in an imaging sensor according to Modification Example 5 of the present disclosure.
Figure 29:
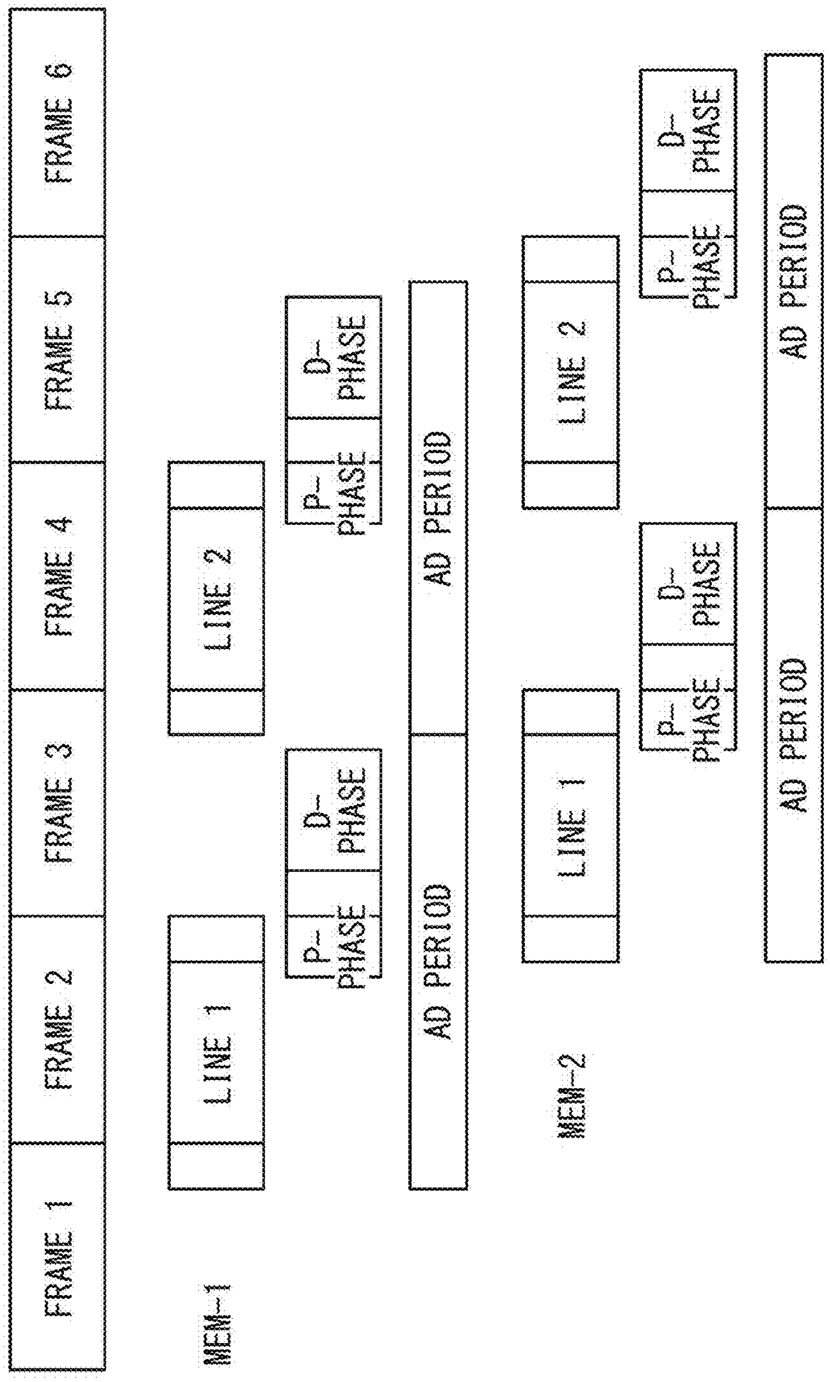
FIG. 29 is a timing chart illustrating an example of an operation of the imaging sensor illustrated in FIG. 26.

FIG. 26 is an equivalent circuit diagram of an array unit of the pixel units U in the imaging sensor 200 according to Modification Example 5 of the present disclosure. FIG. 27 illustrates an example of a planar layout of the light receiving pixels P that constitute the pixel units U illustrated in FIG. 26. FIG. 28 illustrates an example of a cross-sectional configuration of the light receiving pixels P corresponding to line I-I' illustrated in FIG. 27. FIG. 29 is a timing chart illustrating an example of an operation of the imaging sensor 200.

A memory sections MEM may be further provided in the light receiving pixels P that constitute the pixel unit U. Specifically, memory sections MEM-1 and MEM-2 may be provided between the photodiode $PD_A$ and the floating diffusion layers $FD_A$ and $FD_B$, and between the photodiode $PD_B$ and the floating diffusion layers $FD_A$ and $FD_B$, respectively.

The memory sections MEM-1 and MEM-2 are provided, for example, in a layer different from the photodiode PD in a semiconductor substrate. The memory sections MEM-1 and MEM-2 temporarily hold electric charges generated in the photodiode PD.

This making it possible to minimize a period of each in the P-phase and the D-phase, because in the imaging sensor 200 of this modification example, it is not necessary for the floating diffusion layer FD to hold the electric charges generated in the photodiode PD.

As described above, although a description has been given of the present disclosure with reference to the embodiments and Modification Examples 1 to 5, the present techniques are not limited to the above embodiment, or the like, and various modifications are possible.

It is to be noted that effects described herein are merely examples and not to be limited to the description thereof, and there may be other effects.

It is to be noted that the present disclosure may have the following configurations. With the techniques of the following configurations, the one or more analog-to-digital conversion circuits provided for each of the light receiving pixels, and the one or more light receiving pixels in the two pixel units that are adjacent to each other in the first direction, among the plurality of pixel units each including the one or more light receiving pixels and the one or more analog-digital-conversion circuits, are disposed to be adjacent to each other. This reduces frame memory. Therefore, it becomes possible to reduce the chip cost and the power consumption.

(1)

An imaging device including:

one or more light receiving pixels that generate electric charges according to an amount of received light through photoelectric conversion;

one or more analog-to-digital conversion circuits that are provided for each of the light receiving pixels and that convert an analog signal read from each of the one or more light receiving pixels into a digital signal; and a plurality of pixel units each including the one or more light receiving pixels and the one or more analog-to-digital conversion circuits, in which the plurality of pixel units is disposed to allow the one or more light receiving pixels to be adjacent to each other in two pixel units that are adjacent to each other in a first direction.

(2)

The imaging device according to (1), in which the one or more light receiving pixels include respective one or more floating diffusion layers, and the one or more floating diffusion layers are shared among the plurality of pixel units disposed to allow the one or more light receiving pixels to be adjacent to each other in the first direction.

(3)

The imaging device according to (1) or (2), in which a circuit section including at least a portion of the one or more analog-to-digital circuits is provided in parallel to the one or more light receiving pixels in a planar view.

(4)

The imaging device according to (3), in which the circuit section is provided in parallel to the one or more light receiving pixels in the first direction.

(5)

The imaging device according to (4), in which the plurality of pixel units is further disposed to allow the one or more light receiving pixels to be adjacent to each other in a second direction orthogonal to the first direction.

(6)

The imaging device according to (5), in which in the second direction orthogonal to the first direction, the plurality of pixel units is further disposed being offset to the first direction by the one or more light receiving pixels that constitute the plurality of pixel units.

(7)

The imaging device according to (3), in which the circuit section is provided in parallel to the one or more light receiving pixels in a second direction orthogonal to the first direction.

(8)

The imaging device according to (7), in which in the second direction orthogonal to the first direction, the plurality of pixel units is further disposed being offset to the first direction by the one or more light receiving pixels that constitute the plurality of pixel units.

(9)

The imaging device according to any one of (3) to (8), in which a formed area of the one or more analog-to-digital circuits in the plurality of pixel units is ½ or an integral multiple of a formed area of the light receiving pixel.

(10)

The imaging device according to any one of (2) to (9), in which the light receiving pixel further includes: a light receiving section that generates electric charges according to an amount of received light through photoelectric conversion; two first transfer transistors that transfer the electric charges generated in the light receiving section to two of the floating diffusion layers shared by the two pixel units; and a pixel circuit that outputs a pixel signal based on the electric charges to the analog-to-digital conversion circuit.

(11)

The imaging device according to (10), in which the pixel circuit further includes a discharge transistor that resets the light receiving section at any timing.

(12)

The imaging device according to any one of (3) to (11), including:

- a first pixel unit, a second pixel unit, a third pixel unit, and a fourth pixel unit that are disposed in sequence in the first direction, as the plurality of pixel units, in which
- the respective one or more light receiving pixels are disposed adjacently in the first pixel unit and the second pixel unit that are adjacent to each other and in the third pixel unit and the fourth pixel unit that are adjacent to each other, and the respective circuit sections are disposed adjacently in the second pixel unit and the third pixel unit that are adjacent to each other.

(13)

The imaging device according to (12), in which

- the first pixel unit includes one first light receiving pixel and one first floating diffusion layer,
- the second pixel unit includes one second light receiving pixel and one second floating diffusion layer, and
- the first floating diffusion layer and the second floating diffusion layer are disposed at a boundary between the first light receiving pixel and the second light receiving pixel disposed adjacently, and are shared by the first pixel unit and the second pixel unit.

(14)

The imaging device according to (13), in which

- the first pixel unit and the second pixel unit have mutually different exposure timings, and
- electric charges generated in the first light receiving pixel and electric charges generated in the second light receiving pixel are analog-added in the first floating diffusion layer and the second floating diffusion layer, respectively, and thereafter, read out to a pixel circuit that outputs a pixel signal based on the electric charges to the analog-to-digital conversion circuit.

(15)

The imaging device according to (14), in which

- the electric charges generated in the first light receiving pixel are transferred to the first floating diffusion layer in a first frame period and transferred to the second floating diffusion layer in a second frame period, and
- the electric charges generated in the second light receiving pixel are transferred to the first floating diffusion layer in the second frame period and are transferred to the second floating diffusion layer in a third frame period.

(16)

The imaging device according to any one of (1) to (15), further including a signal processor that performs time-delay addition processing on a plurality of the digital signals obtained for each of the light receiving pixels.

(17)

An electronic apparatus including an imaging device. the imaging device including:

- one or more light receiving pixels that generate electric charges according to an amount of received light through photoelectric conversion;
- one or more analog-to-digital conversion circuits that are provided for each of the light receiving pixels and that convert an analog signal read from each of the one or more light receiving pixels into a digital signal; and
- a plurality of pixel units each including the one or more light receiving pixels and the one or more analog-to-digital conversion circuits, in which
- the plurality of pixel units is disposed to allow the one or more light receiving pixels to be adjacent to each other in two pixel units that are adjacent to each other in a first direction.

This application claims priority based on Japanese Patent Application No. 2021-178914 filed on Nov. 1, 2021 with Japan Patent Office, the entire contents of which are incorporated in this application by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging device comprising:

- one or more light receiving pixels that generate electric charges according to an amount of received light through photoelectric conversion;
- one or more analog-to-digital conversion circuits that are provided for each of the light receiving pixels and that convert an analog signal read from each of the one or more light receiving pixels into a digital signal; and
- a plurality of pixel units each including the one or more light receiving pixels and the one or more analog-to-digital conversion circuits, wherein the plurality of pixel units is disposed to allow the one or more light receiving pixels to be adjacent to each other in two pixel units that are adjacent to each other in a first direction, the plurality of pixel units include a first pixel unit, a second pixel unit, a third pixel unit, and a fourth pixel unit that are disposed in sequence in the first direction, the one or more light receiving pixels are disposed adjacently in the first pixel unit and the second pixel unit that are adjacent to each other and in the third pixel unit and the fourth pixel unit that are adjacent to each other, and respective circuit sections are disposed adjacently in the second pixel unit and the third pixel unit that are adjacent to each other, the first pixel unit includes a first light receiving pixel and a first floating diffusion layer, the second pixel unit includes a second light receiving pixel and a second floating diffusion layer, the first floating diffusion layer and the second floating diffusion layer are disposed at a boundary between the first light receiving pixel and the second light receiving pixel disposed adjacently, and are shared by the first pixel unit and the second pixel unit, the first pixel unit and the second pixel unit have mutually different exposure timings, and electric charges generated in the first light receiving pixel and electric charges generated in the second light receiving pixel are analog-added in the first floating diffusion layer and the second floating diffusion layer, respectively, and thereafter, read out to a pixel circuit that outputs a pixel signal based on the electric charges to a corresponding analog-to-digital conversion circuit.

2. The imaging device according to claim 1, wherein the one or more light receiving pixels respectively include one or more floating diffusion layers, and the one or more floating diffusion layers are shared among the plurality of pixel units disposed to allow the one or more light receiving pixels to be adjacent to each other in the first direction.

3. The imaging device according to claim 1, wherein the respective circuit sections include at least a portion of the one or more analog-to-digital circuits and are provided in parallel to the one or more light receiving pixels in a planar view.

4. The imaging device according to claim 3, wherein the respective circuit sections are provided in parallel to the one or more light receiving pixels in the first direction.

5. The imaging device according to claim 4, wherein the plurality of pixel units is further disposed to allow the one or more light receiving pixels to be adjacent to each other in a second direction orthogonal to the first direction.

6. The imaging device according to claim 5, wherein in the second direction orthogonal to the first direction, the plurality of pixel units is further disposed being offset to the first direction by the one or more light receiving pixels that constitute the plurality of pixel units.

7. The imaging device according to claim 3, wherein the respective circuit sections are provided in parallel to the one or more light receiving pixels in a second direction orthogonal to the first direction.

8. The imaging device according to claim 7, wherein in the second direction orthogonal to the first direction, the plurality of pixel units is further disposed being offset to the first direction by the one or more light receiving pixels that constitute the plurality of pixel units.

9. The imaging device according to claim 3, wherein a formed area of the one or more analog-to-digital circuits in the plurality of pixel units is ½ or an integral multiple of a formed area of a corresponding light receiving pixel.

10. The imaging device according to claim 2, wherein a respective light receiving pixel further includes: a light receiving section that generates electric charges according to an amount of received light through photoelectric conversion; two first transfer transistors that transfer the electric charges generated in the light receiving section to two floating diffusion layers shared by the two pixel units; and a pixel circuit that outputs a pixel signal based on the electric charges to a corresponding analog-to-digital conversion circuit.

11. The imaging device according to claim 10, wherein the pixel circuit further includes a discharge transistor that resets the light receiving section at any timing.

12. The imaging device according to claim 1, wherein the electric charges generated in the first light receiving pixel are transferred to the first floating diffusion layer in a first frame period and transferred to the second floating diffusion layer in a second frame period, and the electric charges generated in the second light receiving pixel are transferred to the first floating diffusion layer in the second frame period and are transferred to the second floating diffusion layer in a third frame period.

13. The imaging device according to claim 1, further comprising a signal processor that performs time-delay addition processing on a plurality of the digital signals obtained for each of the light receiving pixels.

14. An electronic apparatus comprising an imaging device, the imaging device including:

one or more light receiving pixels that generate electric charges according to an amount of received light through photoelectric conversion;

one or more analog-to-digital conversion circuits that are provided for each of the light receiving pixels and that convert an analog signal read from each of the one or more light receiving pixels into a digital signal; and a plurality of pixel units each including the one or more light receiving pixels and the one or more analog-to-digital conversion circuits, wherein the plurality of pixel units is disposed to allow the one or more light receiving pixels to be adjacent to each other in two pixel units that are adjacent to each other in a first direction, the plurality of pixel units include a first pixel unit, a second pixel unit, a third pixel unit, and a fourth pixel unit that are disposed in sequence in the first direction, the one or more light receiving pixels are disposed adjacently in the first pixel unit and the second pixel unit that are adjacent to each other and in the third pixel unit and the fourth pixel unit that are adjacent to each other, and respective circuit sections are disposed adjacently in the second pixel unit and the third pixel unit that are adjacent to each other, the first pixel unit includes a first light receiving pixel and a first floating diffusion layer, the second pixel unit includes a second light receiving pixel and a second floating diffusion layer, the first floating diffusion layer and the second floating diffusion layer are disposed at a boundary between the first light receiving pixel and the second light receiving pixel disposed adjacently, and are shared by the first pixel unit and the second pixel unit, the first pixel unit and the second pixel unit have mutually different exposure timings, and electric charges generated in the first light receiving pixel and electric charges generated in the second light receiving pixel are analog-added in the first floating diffusion layer and the second floating diffusion layer, respectively, and thereafter, read out to a pixel circuit that outputs a pixel signal based on the electric charges to a corresponding analog-to-digital conversion circuit.

15. The electronic apparatus according to claim 14, wherein the electric charges generated in the first light receiving pixel are transferred to the first floating diffusion layer in a first frame period and transferred to the second floating diffusion layer in a second frame period, and the electric charges generated in the second light receiving pixel are transferred to the first floating diffusion layer in the second frame period and are transferred to the second floating diffusion layer in a third frame period.

16. The electronic apparatus according to claim 14, further comprising a signal processor that performs time-delay addition processing on a plurality of the digital signals obtained for each of the light receiving pixels.

* * * * *